(12) United States Patent
Terano et al.

(10) Patent No.: US 6,812,292 B2
(45) Date of Patent: Nov. 2, 2004

(54) PROPYLENE/ETHYLENE BLOCK COPOLYMER, BLUSHING-RESISTANT TRANSPARENT POLYPROPYLENE RESIN FOR MOLDING, ELASTOMER FOR MOLDING, AND MOLDED ARTICLE OBTAINED THEREFROM

(75) Inventors: Minoru Terano, Daigakushukusha A-35, 1-50, Asahidai, Tatsunokuchi-machi, Nomi-gun Ishikawa 923-1211 (JP); Tetsuya Matsukawa, Kanagawa (JP); Hideshi Satake, Kanagawa (JP); Masato Takahashi, Kanagawa (JP)

(73) Assignees: Chisso Petrochemical Corporation, Tokyo (JP); Japan Science and Technology Corporation, Saitama (JP); Minoru Terano, Ishikawa (JP)

( * ) Notice: Subject to any disclaimer, the term of this patent is extended or adjusted under 35 U.S.C. 154(b) by 0 days.

(21) Appl. No.: 10/668,198

(22) Filed: Sep. 24, 2003

(65) Prior Publication Data

US 2004/0072957 A1 Apr. 15, 2004

Related U.S. Application Data

(63) Continuation of application No. 09/807,842, filed as application No. PCT/JP99/05769 on Oct. 19, 1999.

(30) Foreign Application Priority Data

| Oct. 19, 1998 | (JP) | ............................................ 10-297228 |
| Oct. 19, 1998 | (JP) | ............................................ 10-297231 |
| Oct. 19, 1998 | (JP) | ............................................ 10-297232 |

(51) Int. Cl.$^7$ ............................................. C08F 297/08
(52) U.S. Cl. ........................ 525/323; 525/88; 525/247; 525/268
(58) Field of Search ................................ 525/323, 247, 525/268, 88

(56) References Cited

U.S. PATENT DOCUMENTS

| 4,006,116 A | 2/1977 | Dominguez |
| 5,362,782 A | 11/1994 | McCullough, Jr. et al. |
| 5,741,862 A | 4/1998 | Muller et al. |
| 6,211,300 B1 | 4/2001 | Terano et al. |

FOREIGN PATENT DOCUMENTS

| EP | 703253 | 3/1996 |
| JP | 50-14742 | 2/1975 |
| JP | 52-65551 | 5/1977 |
| JP | 56-072042 | 6/1981 |
| JP | 57-063350 | 4/1982 |
| JP | 58-206644 | 12/1983 |
| JP | 58-215446 | 12/1983 |
| JP | 60-190409 | 9/1985 |
| JP | 61-014248 | 1/1986 |
| JP | 05-331327 | 12/1993 |
| JP | 06-145268 | 5/1994 |
| JP | 07-173233 | 7/1995 |
| JP | 08-269258 | 10/1996 |
| JP | 09-087343 | 3/1997 |
| JP | 09-241334 | 9/1997 |

*Primary Examiner*—Fred Teskin
(74) *Attorney, Agent, or Firm*—Wenderoth, Lind & Ponack, L.L.P.

(57) ABSTRACT

A polypropylene/ethylene block copolymer, which has a poly(ethylene-co-propylene) segment content of 5 to 100 wt. %, excluding 100 wt. %, and a total ethylene content of 2 to 95 wt. %. (a) The block polymer comprises polypropylene segments and poly(ethylene-co-propylene) segments chemically bonded thereto, and (b) the polypropylene segments and the poly(ethylene-co-propylene) segments have been synthesized in the presence of an olefin polymerization catalyst comprising an organometallic compound and a solid catalyst component comprising either titanium and a halogen, or titanium, magnesium, and a halogen. The block copolymer has a weight-average molecular weight of 100,000 or higher, is suitable for producing general-purpose molded articles, and has an excellent balance among mechanical properties, impact resistance, thermal properties, transparency, moldability, and other properties.

34 Claims, 5 Drawing Sheets

PROPYLENE/ETHYLENE BLOCK COPOLYMER, BLUSHING-RESISTANT TRANSPARENT POLYPROPYLENE RESIN FOR MOLDING, ELASTOMER FOR MOLDING, AND MOLDED ARTICLE OBTAINED THEREFROM

This application is a Continuation application of Ser. No. 09/807,842, filed Jul. 9, 2001, which is a 371 application of PCT/JP99/05769 filed Oct. 19, 1999.

TECHNICAL FIELD

The present invention I relates to a novel polypropylene block copolymer, which has a high molecular weight and comprises polypropylene-b-poly(ethylene-co-propylene) including a polypropylene segment and a poly(ethylene-co-propylene) segment, with the two types of segments being chemically linked.

The present invention II relates to a blushing-resistant transparent polypropylene resin for molding, comprising a novel polypropylene block copolymer, polypropylene-b-poly(ethylene-co-propylene), including a polypropylene segment and a poly(ethylene-co-propylene) segment, with the two types of segments being chemically linked, and to molded articles obtained therefrom. The molded articles exhibit excellent transparency and blushing resistance, as well as well-balanced tensile strength, tensile elongation, impact resistance at low temperature, and heat resistance.

The present invention III relates to an elastomer for molding, comprising a novel polypropylene block copolymer, polypropylene-b-poly(ethylene-co-propylene), including a polypropylene segment and a poly(ethylene-co-propylene) segment, with the two types of segments being chemically linked. Molded articles obtained therefrom exhibit excellent transparency, blushing resistance, and flexibility and have excellent impact resistance, mechanical strength, and appearance.

BACKGROUND ART

Today, polypropylene resins, which are comparatively inexpensive and exhibit excellent thermal and mechanical strength, are used in a variety of fields. Propylene homopolymers generally have high rigidity, but have poor transparency, impact resistance, and particularly, poor impact resistance at low temperatures.

Propylene-α-olefin random copolymers, which are produced by copolymerizing propylene and a small amount of α olefin so as to enhance transparency of propylene homopolymers, are widely employed in a variety of industrial fields, beginning with in domestic electric appliances and articles for daily use. These conventionally employed propylene random copolymers have excellent transparency. However, these copolymers have poor impact resistance as compared with propylene homopolymers and have considerably low heat resistance, imposing a limitation on the temperature at which they are used. Thus, the field of use of these copolymers is limited.

In order to enhance impact resistance of propylene homopolymers at low temperatures, propylene block copolymers, which are produced by forming a propylene homopolymer component and, subsequently forming an ethylene-propylene random copolymer, are widely employed in a variety industrial fields, beginning with in automobiles and domestic electric appliances and articles for daily use.

These conventionally employed propylene block copolymers have excellent impact resistance, but have considerably poor transparency as compared with propylene homopolymers. Thus, the block copolymers undergo severe blushing under impact.

In order to overcome undesirable impact-induced-blushing of these propylene block copolymers, there have been proposed a method involving increasing the ethylene content of a copolymer and a method involving addition of polyethylene to a propylene block copolymer. These two methods are excellent in view of mitigation of impact-induced-blushing; however, the transparency of molded articles decreases.

In addition, Japanese Patent Application Laid-Open (kokai) No. 5-331327 discloses a polymer composition in which only the ratio of intrinsic viscosity of the propylene homopolymer component to that of the ethylene-propylene random copolymer component is specified in a propylene block copolymer and, Japanese Patent Application Laid-Open (kokai) No. 6-145268 discloses a polymer composition in which the ratio of intrinsic viscosity of the propylene homopolymer component to that of the ethylene-propylene random copolymer component and the ethylene content of the ethylene-propylene random copolymer component are both specified.

However, when injection-molded articles of the aforementioned polymer composition were tested for properties including impact resistance, blushing, and haze (which is an index of transparency), it was found that these properties were improved as compared with conventional propylene block copolymer, but that the degree of improvement was still unsatisfactory.

As described in Japanese Patent Application Laid-Open (kokai) Nos. 56-72042 and 57-63350 discloses a polyolefin resin compositions formed by blending an ethylene-propylene copolymer containing a small amount of ethylene with an ethylene-propylene block copolymer. However, the resin composition has drawbacks; e.g., an economical disadvantage due to the requirement for a blending step and a decrease in performance of final products due to poor dispersion of components.

Japanese Patent Application Laid-Open (kokai) Nos. 8-92338 and 9-87343 disclose a polypropylene-b-poly (ethylene-co-propylene) comprising a polypropylene segment and a poly(ethylene-co-propylene) segment, with the two types of segments being chemically linked, and a method of producing the same. Specifically, disclosed therein are block copolymers having a number-average molecular weight (Mn) of 11,000–20,000; a molecular weight distribution index (weight-average molecular weight (Mw)/number-average molecular weight (Mn)) of 3.3–3.8; and an ethylene content of 26 mol %.

However, such polymers having a low weight-average molecular weight are not suitable for producing general-purpose molded articles.

Japanese Patent Application Laid-Open (kokai) No. 9-241334 discloses a block copolymer having an intrinsic viscosity [η] of 0.8, a block copolymer segment content of 34 wt. %, and an ethylene content of the block copolymer segment of 40 wt. %.

However, the polymer disclosed therein also has a weight-average molecular weight of as low as approximately 80,000, and thus, it is not suitable for producing general-purpose molded articles.

In addition, there have conventionally been known polyolefin thermoplastic elastomers produced by incorporating, into a polypropylene polymer, an amorphous ethylene-α-olefin random copolymer or by incorporating, into a polypropylene polymer, a hydrogenated product of a styrene-butadiene block copolymer. These elastomers are disclosed in, for example, Japanese Patent Application Laid-Open (kokai) Nos. 50-14742, 52-65551, 58-206644, and 58-215446.

However, the elastomer compositions produced by incorporating, into a polypropylene copolymer, a hydrogenated product of a styrene-butadiene block copolymer and hydrocarbon oil for improving flowability provide molded articles having a disadvantageously decreased mechanical strength (tensile strength and bending strength). Although the elastomer compositions produced by incorporating, into a polypropylene polymer, an amorphous ethylene-α-olefin random copolymer have good rubber elasticity, the compositions disadvantageously exhibit poor mold-releasability during molding thereof and, if the amorphous ethylene-α-olefin random copolymer content is high, even no mold-releasability at all.

Japanese Patent Application Laid-Open (kokai) No. 61-14248 discloses an elastomer composition produced by incorporating, into a propylene-ethylene block copolymer, a hydrogenated product of a styrene-butadiene-styrene block copolymer and, optionally, an amorphous ethylene-propylene rubber.

However, the above elastomer composition still have a problem in that it provides molded articles with a defective appearance due to, e.g., flow marking on the surfaces of produced articles.

The elastomer composition produced by adding optional amorphous ethylene-propylene rubber to a mixture of a propylene homopolymer and the aforementioned hydrogenated product of a styrene-butadiene block copolymer cannot attain favorable rubber elasticity and has an insufficient impact resistance at low temperatures. Although a similar elastomer composition employing a propylene-ethylene random copolymer instead of the aforementioned propylene homopolymer provides molded articles having excellent mechanical strength, impact resistance, and appearance, sink marks and fins are prone to be generated on the articles, thereby disadvantageously lowering moldability.

Japanese Patent Application Laid-Open (kokai) No. 5-1817 discloses a composition for solving the aforementioned problems. Specifically, the composition is produced by incorporating, into a polypropylene copolymer comprising a propylene-ethylene block copolymer and a crystalline propylene-ethylene random copolymer, a hydrogenated product of styrene-butadiene block copolymer.

As described above, specific amounts of a variety of copolymers have been incorporated into elastomer compositions in order to solve the problems unique to such elastomers. However, since the thus-produced elastomer compositions are provided in the form of mixtures, dispersion of components is poor and not homogeneous, and articles having excellent transparency and blushing resistance have never been produced from such compositions.

Japanese Patent Application Laid-Open (kokai) No. 8-269258 discloses a composition for producing a transparent and blushing-resistant elastomer composition. Specifically, the composition is produced by incorporating, into a polypropylene copolymer, an ethylene-α-olefin copolymer elastomer having a limited composition. However, in this case also, the composition has drawbacks; e.g., an economical disadvantage due to the requirement for a blending step and a decrease in performance of final products due to poor dispersion of components.

In view of the foregoing, an object of the present invention I is to provide a propylene-ethylene block copolymer which has a weight-average molecular weight of 100,000 or more; is suitable for producing general-purpose molded articles; and has well-balanced mechanical properties, impact resistance, thermal properties, transparency, moldability, and other properties.

As described above, the conventional ethylene-propylene block copolymers cannot fully attain the target properties, since a polypropylene segment and a poly(ethylene-co-propylene) segment are linked not chemically. Thus, an object of the present invention II is to provide a blushing-resistant transparent polypropylene resin for molding, which resin exhibits further enhanced transparency and blushing resistance and has well-balanced tensile strength, tensile elongation, impact resistance, and thermal properties. Another object of Invention II is to provide molded articles obtained therefrom.

Further, an object of the present invention III is to provide a polypropylene elastomer for molding, which elastomer, when employed alone, can provide molded articles exhibiting excellent transparency, blushing resistance, and flexibility and have excellent impact resistance and mechanical strength.

DISCLOSURE OF THE INVENTION

Regarding the present invention I, the present inventors have conducted extensive studies on the factors affecting physical properties and moldability of propylene-ethylene block copolymers, and have found that, in contrast to a block copolymer according to the conventional technique in which polypropylene and poly(ethylene-co-propylene) are present in a blended state, the propylene-ethylene block copolymer of the present invention is a copolymer containing a genuine block copolymer as defined in polymer chemistry in which the polypropylene segments and the poly(ethylene-co-propylene) segments are linked via a chemical bond; having a sufficiently large weight-average molecular weight; capable of providing general-purpose molded articles through molding; and providing molded articles with well-balanced mechanical properties, impact resistance, thermal properties, transparency, and physical properties during processing, etc. The present invention I has been accomplished on the basis of these findings.

Accordingly, Invention I-1 provides a propylene-ethylene block copolymer containing polypropylene-b-poly(ethylene-co-propylene), characterized by having a weight-average molecular weight (Mw) of the propylene-ethylene block copolymer of 100,000 or more; a poly(ethylene-co-propylene) segment content of not less than 5 wt. % and less than 100 wt. %; and a total ethylene content of 2–95 wt. %, wherein the propylene-ethylene block copolymer has the following characteristics (a) and (b):

(a) polypropylene segments and poly(ethylene-co-propylene) segments are linked chemically; and (b) the polypropylene segments and poly(ethylene-co-propylene) segments are synthesized in the presence of an olefin polymerization catalyst comprising an organometallic compound and a solid catalyst component comprising either titanium and a halogen or titanium, magnesium, and a halogen.

Invention I-2 provides a propylene-ethylene block copolymer as described in Invention I-1, wherein the propylene-ethylene block copolymer has a molecular weight distribution index (weight-average molecular weight (Mw)/number-average molecular weight (Mn)) of 3.5 or more.

Invention I-3 provides a propylene-ethylene block copolymer as described in Invention I-1 or I-2, wherein the propylene-ethylene block copolymer contains a xylene-soluble component during extraction by use of xylene at 20° C. in an amount of 50 wt. % or less.

Invention I-4 provides a propylene-ethylene block copolymer as described in any one of Inventions I-1 to I-3, wherein the ratio of the poly(ethylene-co-propylene) segments remaining after extraction by use of xylene at 20° C. to the segments before extraction is 50 wt. % or more.

Invention I-5 provides a propylene-ethylene block copolymer as described in any one of Inventions I-1 to I-4, wherein the ratio of the total ethylene content remaining after extraction by use of xylene at 20° C. to the content before extraction is 50 wt. % or more.

Invention I-6 provides a propylene-ethylene block copolymer as described in any one of Inventions I-1 to I-5, wherein the propylene-ethylene block copolymer has an elution-completion temperature in cross-fractionation chromatography of 100–120° C.

Invention I-7 provides a propylene-ethylene block copolymer as described in any one of Inventions I-1 to I-6, wherein the propylene-ethylene block copolymer has a melting point (Tm) of 135° C. or higher.

Invention I-8 provides a propylene-ethylene block copolymer as described in any one of Inventions I-1 to I-7, wherein the propylene-ethylene block copolymer exhibits a melt tension at 190° C. of 1.0 g or more.

Invention I-9 provides a propylene-ethylene block copolymer as described in any one of Inventions I-1 to I-8, wherein the peak temperature of complex modulus loss tangent (tanδ) based on glass transition temperature of the PP portion of the propylene-ethylene block copolymer falls within the range of –50° C. to 10° C.

Invention I-10 provides a propylene-ethylene block copolymer as described in any one of Inventions I-1 to I-9, wherein the propylene-ethylene block copolymer exhibits a storage modulus (E') at 150° C. of $(0.1–30)\times 10^7$ dyne/cm$^2$.

Invention I-11 provides a propylene-ethylene block copolymer containing polypropylene-b-poly(ethylene-co-propylene), characterized in that the weight-average molecular weight (Mw) of the propylene-ethylene block copolymer is 100,000 or more; the poly(ethylene-co-propylene) segment content is not less than 5 wt. % and less than 100 wt. %; the total ethylene content is 2–95 wt. %; the molecular weight distribution index (weight-average molecular weight (Mw)/number-average molecular weight (Mn)) is 3.5 or more; the propylene-ethylene block copolymer contains a xylene-soluble component during extraction by use of xylene at 20° C. in an amount of 50 wt. % or less; and the ratio of the poly(ethylene-co-propylene) segments remaining after extraction by use of xylene at 20° C. to the segments before extraction is 50 wt. % or more.

Invention I-12 provides a propylene-ethylene block copolymer as described in Invention I-11, wherein the ratio of the total ethylene content remaining after extraction by use of xylene at 20° C. to the content before extraction is 50 wt. % or more.

Invention I-13 provides a propylene-ethylene block copolymer as described in Invention I-11 or I-12, wherein the propylene-ethylene block copolymer has an elution-completion temperature in cross-fractionation chromatography of 100–120° C.

Invention I-14 provides a propylene-ethylene block copolymer as described in any one of Inventions I-11 to I-13, wherein the propylene-ethylene block copolymer has a melting point (Tm) of 135° C. or higher.

Invention I-15 provides a propylene-ethylene block copolymer as described in any one of Inventions I-11 to I-14, wherein the propylene-ethylene block copolymer exhibits a melt tension at 190° C. of 1.0 g or more.

Invention I-16 provides a propylene-ethylene block copolymer as described in any one of Inventions I-11 to I-15, wherein the peak temperature of complex modulus loss tangent (tanδ) based on a glass transition temperature of the PP portion of the propylene-ethylene block copolymer falls within the range of –50° C. to 10° C.

Invention I-17 provides a propylene-ethylene block copolymer as described in any one of Inventions I-11 to I-16, wherein the propylene-ethylene block copolymer exhibits a storage modulus (E') at 150° C. of $(0.1–30)\times 10^7$ dyne/cm$^2$.

Regarding the present invention II, the present inventors have conducted extensive studies on the factors affecting transparency, blushing resistance, tensile elongation, and heat resistance of propylene-ethylene block copolymers, and have found that, in contrast to block copolymer according to the conventional technique in which polypropylene and poly(ethylene-co-propylene) are present in a blended state, the blushing-resistant transparent polypropylene resin for molding of the present invention is a copolymer containing a genuine block copolymer as defined in polymer chemistry in which the polypropylene segments and the poly(ethylene-co-propylene) segments are linked via a chemical bond, and can improve transparency, blushing resistance, tensile strength, tensile elongation, and heat resistance by solo use thereof. Invention II has been accomplished on the basis of these findings.

Accordingly, Invention II-1 provides a blushing-resistant transparent polypropylene resin for molding containing polypropylene-b-poly(ethylene-co-propylene) characterized by having a poly(ethylene-co-propylene) segment content of polypropylene-b-poly(ethylene-co-propylene) of not less than 5 wt. % and less than 50 wt. % and a total ethylene content of polypropylene-b-poly(ethylene-co-propylene) of 0.25–47 wt. %, wherein the polypropylene-b-poly(ethylene-co-propylene) has the following characteristics (a) and (b)

(a) polypropylene segments and poly(ethylene-co-propylene) segments are linked chemically; and (b) the polypropylene segments are synthesized in the presence of an olefin polymerization catalyst comprising an organometallic compound and a solid catalyst component comprising either titanium and a halogen or titanium, magnesium, and a halogen, and subsequently, the poly(ethylene-co-propylene) segments are synthesized.

Invention II-2 provides a blushing-resistant transparent polypropylene resin for molding as described in Invention II-1, wherein the polypropylene-b-poly(ethylene-co-propylene) has a weight-average molecular weight (Mw) of 30,000 or more.

Invention II-3 provides a blushing-resistant transparent polypropylene resin for molding as described in Invention II-1 or II-2, wherein the polypropylene-b-poly(ethylene-co-propylene) has a molecular weight distribution index (weight-average molecular weight (Mw)/number-average molecular weight (Mn)) of 3.5 or more.

Invention II-4 provides a blushing-resistant transparent polypropylene resin for molding as described in any one of Inventions II-1 to II-3, wherein the polypropylene-b-poly(ethylene-co-propylene) contains a component soluble in xylene at 20° C. in an amount of 50 wt. % or less.

Invention II-5 provides a blushing-resistant transparent polypropylene resin for molding as described in any one of Inventions II-1 to II-4, wherein the polypropylene-b-poly(ethylene-co-propylene) has a melting point (Tm) of 135° C. or higher.

Invention II-6 provides a blushing-resistant transparent polypropylene molded article formed by molding a blushing-resistant transparent polypropylene resin for molding as recited in any one of Inventions II-1 to II-5.

Invention II-7 provides a blushing-resistant transparent polypropylene molded article as described in Invention II-6, wherein molding is carried out through injection molding.

Regarding the present invention III, the present inventors have conducted extensive studies in order to solve the aforementioned problems of polypropylene elastomer compositions, and have found that, in contrast to conventional block copolymers in which polypropylene and poly(ethylene-co-propylene) are present in a blended state, the elastomer for molding of the present invention is a copolymer containing a genuine block copolymer as defined in polymer chemistry in which the polypropylene segments and the poly(ethylene-co-propylene) segments are linked via a chemical bond, and can solve the problems by solo use thereof and without adding an elastomer such as a hydrogenated product of a styrene-butadiene block copolymer or an ethylene-α-olefin copolymer. Invention III has been accomplished on the basis of these findings.

Accordingly, Invention III-1 provides an elastomer for molding containing polypropylene-b-poly(ethylene-co-propylene), characterized by having a poly(ethylene-co-propylene) segment content of polypropylene-b-poly(ethylene-co-propylene) of 50–95 wt. % and a total ethylene content of polypropylene-b-poly(ethylene-co-propylene) of 2.5–95 wt. %, wherein the polypropylene-b-poly(ethylene-co-propylene) has the following characteristics (a) and (b):

(a) polypropylene segments and poly(ethylene-co-propylene) segments are linked chemically; and (b) the polypropylene segments are synthesized in the presence of an olefin polymerization catalyst comprising an organometallic compound and a solid catalyst component comprising either titanium and a halogen or titanium, magnesium, and a halogen, and subsequently, the poly(ethylene-co-propylene) segments are synthesized.

Invention III-2 provides an elastomer for molding as described in Invention III-1, wherein the polypropylene-b-poly(ethylene-co-propylene) has a weight-average molecular weight (Mw) of 30,000 or more.

Invention III-3 provides an elastomer for molding as described in Invention III-1 or III-2, wherein the polypropylene-b-poly(ethylene-co-propylene) has a molecular weight distribution index (weight-average molecular weight (Mw)/number-average molecular weight (Mn)) of 3.5 or more.

Invention III-4 provides an elastomer for molding as described in any one of Inventions III-1 to III-3, wherein the polypropylene-b-poly(ethylene-co-propylene) contains a component soluble in xylene at 20° C. in an amount of 50 wt. % or less.

Invention III-5 provides an elastomer for molding as described in any one of Inventions III-1 to III-4, wherein the polypropylene-b-poly(ethylene-co-propylene) has a melting point (Tm) of 135° C. or higher.

Invention III-6 provides an elastomer-molded article formed by molding an elastomer for molding as recited in any one of Inventions III-1 to III-5.

Invention III-7 provides an elastomer-molded article as described in Invention III-6, wherein molding is carried out through injection molding.

(1) shows a tensile test sample.
(2) shows a bending test sample.
(3) shows an Izod test sample.
(4) shows a plate used in tests.

Figure 2:
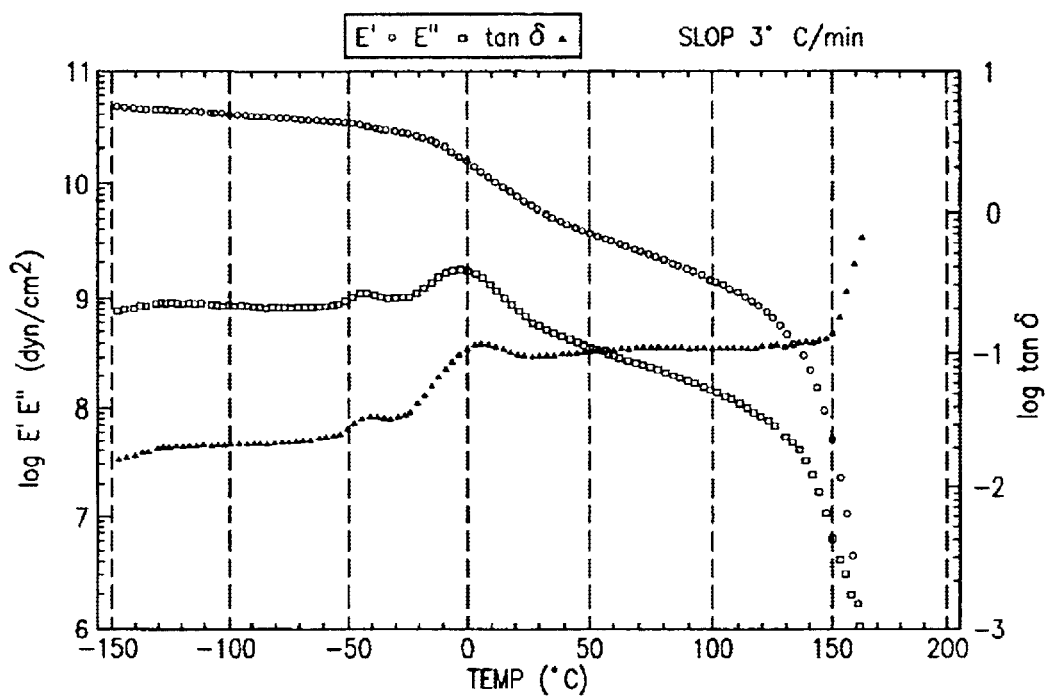

FIG. 2 is a graph showing measurement results of dynamic viscoelasticity of the propylene-ethylene block copolymer obtained in Example I-2 according to the present invention.

Figure 3:
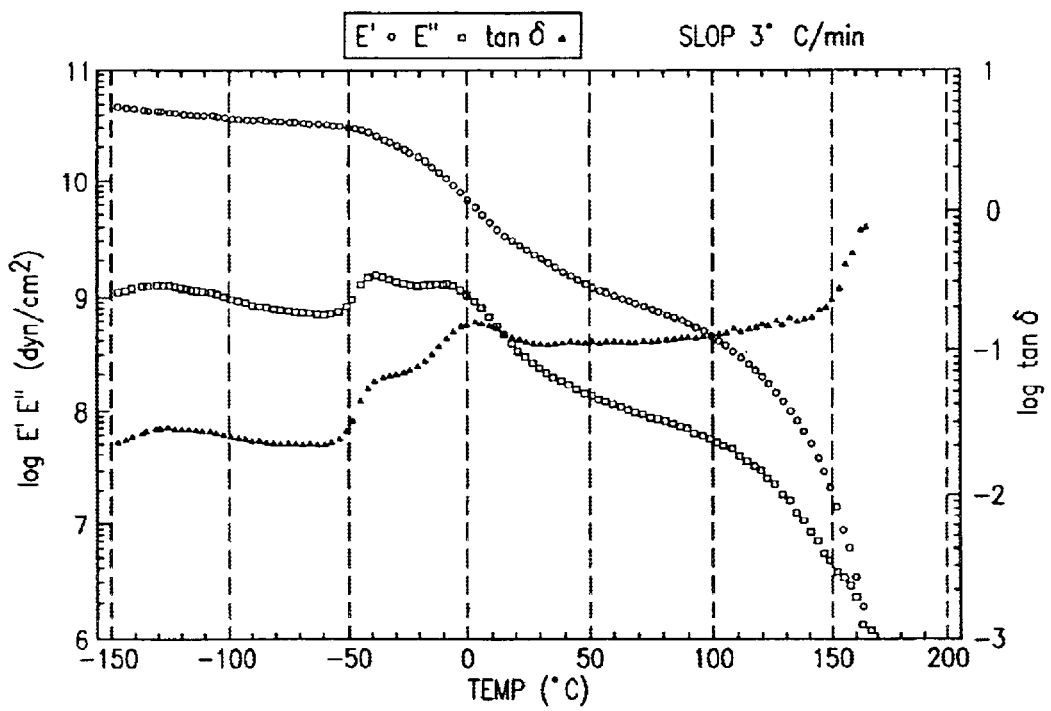

FIG. 3 is a graph showing measurement results of dynamic viscoelasticity of the propylene-ethylene block copolymer obtained in Example I-5 according to the present invention.

Figure 4:
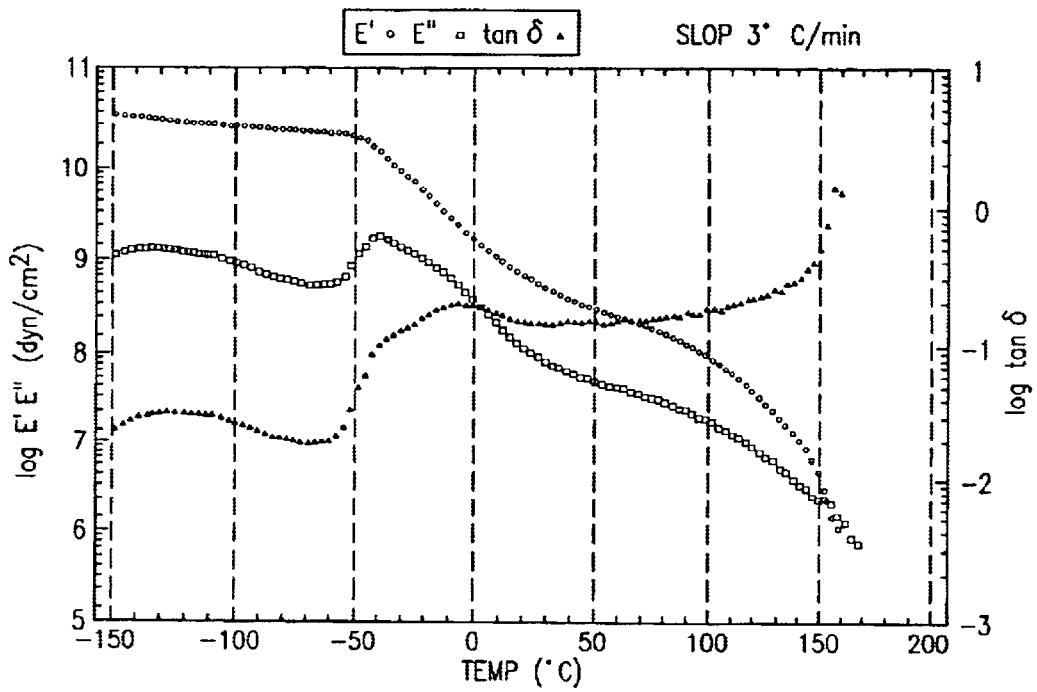

FIG. 4 is a graph showing measurement results of dynamic viscoelasticity of the propylene-ethylene block copolymer obtained in Example I-6 according to the present invention.

Figure 5:
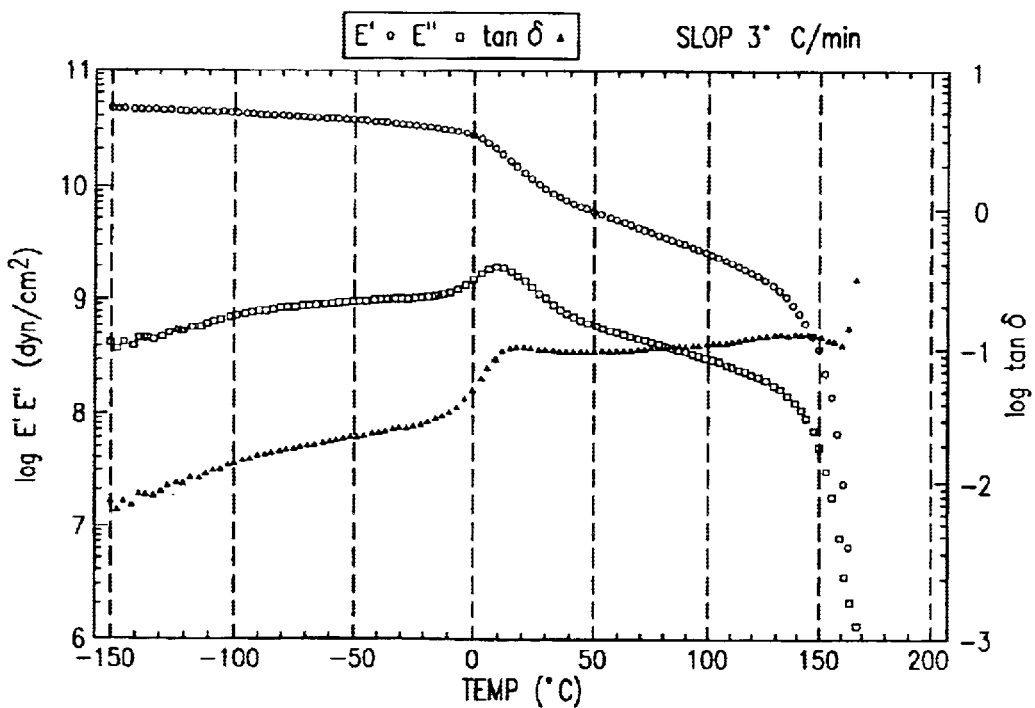

FIG. 5 is a graph showing measurement results of dynamic viscoelasticity of the propylene-ethylene block copolymer obtained in comparative Example I-1.

Figure 6:
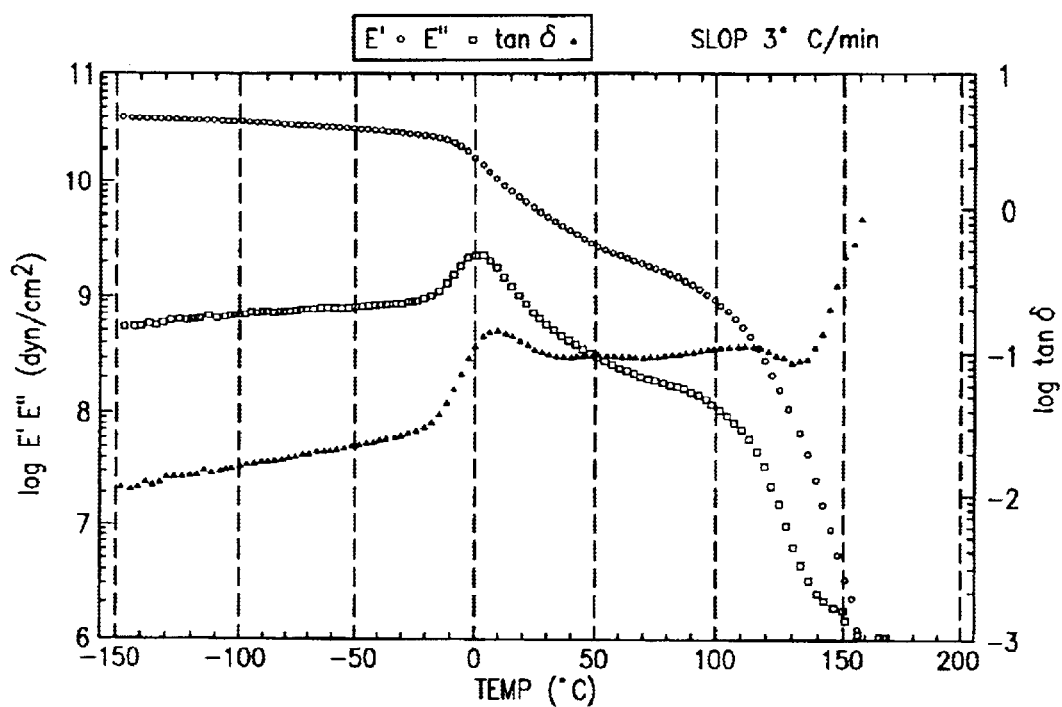

FIG. 6 is a graph showing measurement results of dynamic viscoelasticity of the propylene-ethylene block copolymer obtained in Comparative Example I-3.

Figure 7:
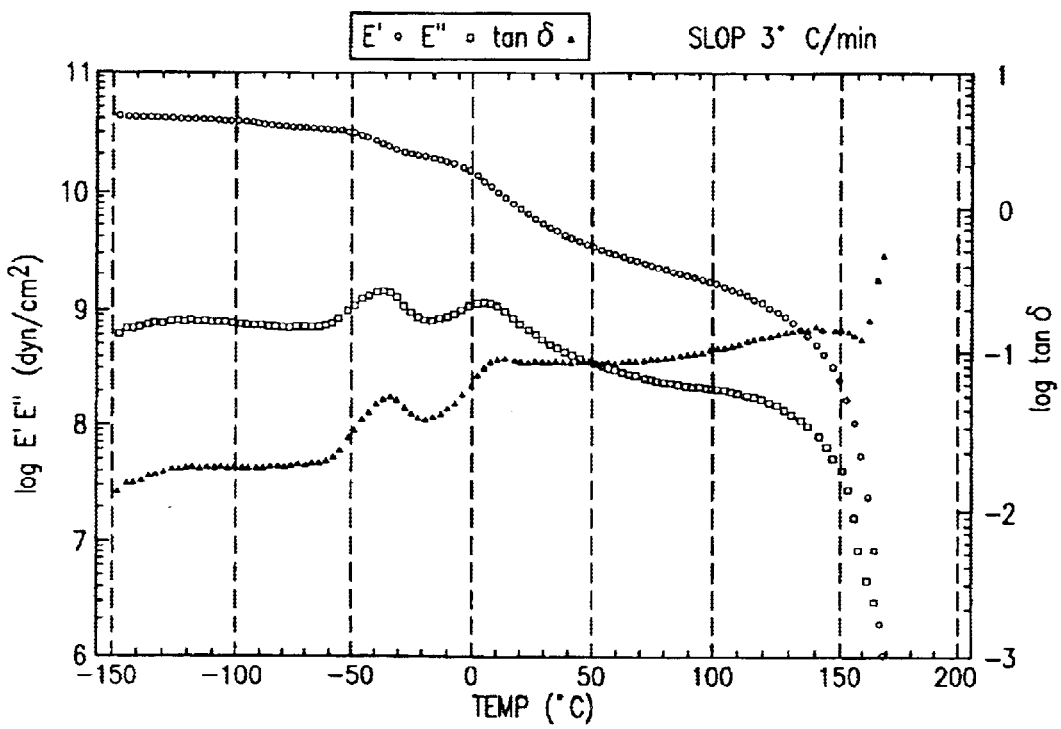

FIG. 7 is a graph showing measurement results of dynamic viscoelasticity of the propylene-ethylene block copolymer obtained in Comparative Example I-5.

Figure 8:
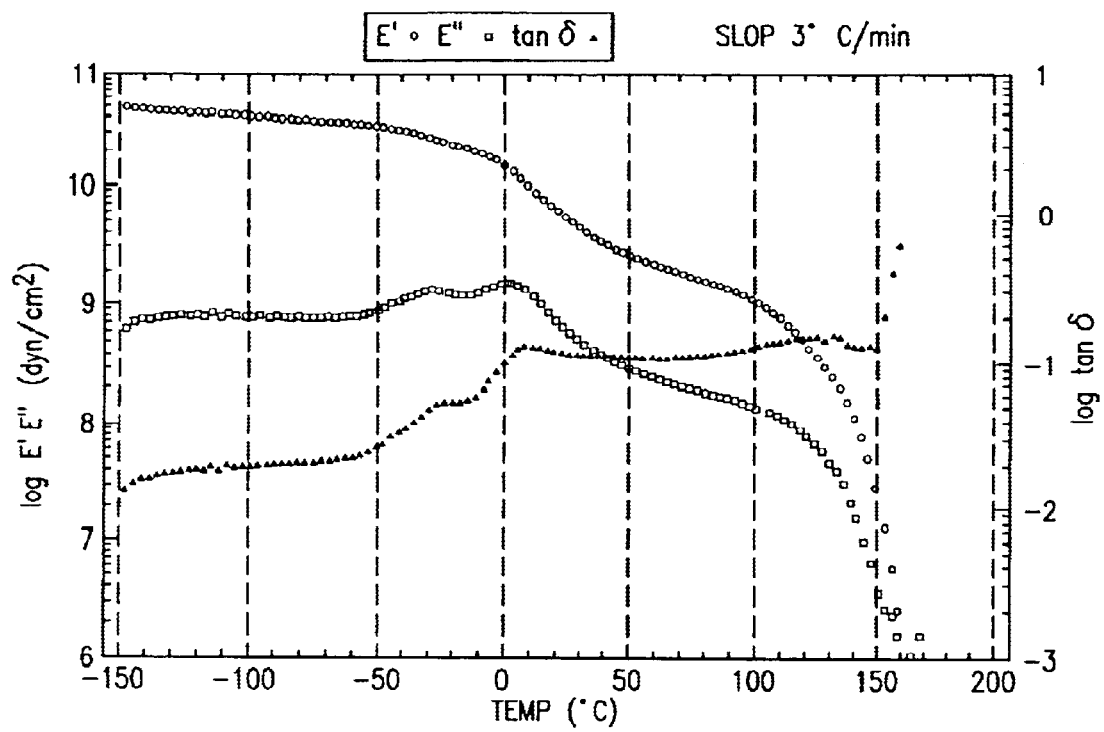

FIG. 8 is a graph showing measurement results of dynamic viscoelasticity of the propylene-ethylene block copolymer obtained in Comparative Example I-6.

In each graph showing measurement results of dynamic viscoelasticity, the left vertical axis indicates storage modulus (E') denoted by "o" and loss modulus (E") denoted by "square"; the right vertical axis indicates complex modulus loss tangent (tanδ) denoted by "Δ"; and the horizontal axis indicates temperature.

Figure 9:
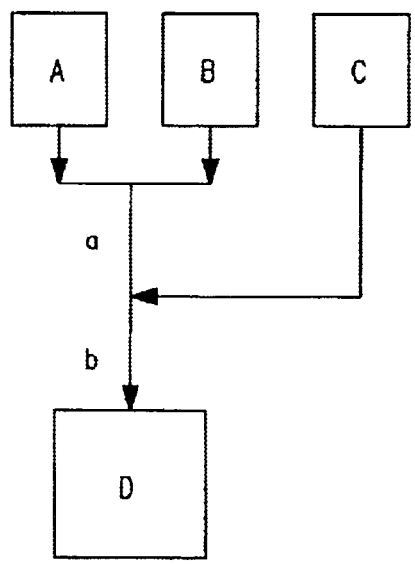

FIG. 9 is a flow sheet showing a polymerization method according to the present invention.

In FIGS. 9, A, B, C, and D denote containers, and a and b denote polymerization area.

BEST MODES FOR CARRYING OUT THE INVENTION

In the present invention, the polypropylene portion (represented by "polypropylene-") in the block copolymer represented by "polypropylene-b-poly(ethylene-co-propylene)" is referred to as "polypropylene segment," and the copolymer portion (represented by "-poly(ethylene-co-propylene)") is referred to as "poly(ethylene-co-propylene) segment."

The propylene homopolymer is referred to as "polypropylene," and the ethylene-propylene copolymer is referred to as "poly(ethylene-co-propylene)."

In the present invention, a genuine block copolymer in which the polypropylene segments and the poly(ethylene-co-propylene) segments are linked via a chemical bond (covalent bond) is referred to as "polypropylene-b-poly(ethylene-co-propylene)." The genuine block copolymer may be simply referred to as "block copolymer" so long as these terms cause no misunderstanding.

In addition, the produced polypropylene-b-poly(ethylene-co-propylene) represents the entirety of formed polymer containing polypropylene-b-poly(ethylene-co-propylene) (i.e., propylene-ethylene block copolymer in Invention I; blushing-resistant transparent polypropylene resin for molding in Invention II; and elastomer for molding in Invention III).

The propylene-ethylene block copolymer according to the present inventions I to III is synthesized by two synthesis steps: synthesizing the polypropylene segments in the presence of an olefin polymerization catalyst comprising an organometallic compound such as triethylaluminum and a solid catalyst component comprising either titanium and a halogen or titanium, magnesium, and a halogen, and an optional electron-donating compound by use of a polymerizer, preferably a tube-like polymerizer as disclosed in Japanese Patent Application Laid-Open (kokai) No. 9-87343 (as shown in FIG. 9 in the present invention), through preferably a liquid-phase method for a short period of time in the polymerization area (a); and, immediately after completion of the first synthesis, synthesizing predetermined amounts of the poly(ethylene-co-propylene) segments for a short period of time in the polymerization area (b) on the downstream side. The thus-synthesized copolymer is a propylene-ethylene block copolymer containing polypropylene-b-poly(ethylene-co-propylene) in which the polypropylene segments and the poly(ethylene-co-propylene) segments are linked via a chemical bond (covalent bond).

Firstly, Invention I (novel polypropylene block copolymer) will be described in detail.

Invention I is directed to a propylene-ethylene block copolymer obtained in the aforementioned manner, wherein the block polymer has a weight-average molecular weight (Mw) of 100,000 or more; a poly(ethylene-co-propylene) segment content of not less than 5 wt. % and less than 100 wt. %; and a total ethylene content of 2–95 wt. %.

The aforementioned block copolymer, which has heretofore never been produced, can be produced by enhancing catalytic activity through modification of the pre-contact method, contact ratio, type of electron-donating compounds, ratio and method of addition, etc., and controlling polymerization conditions such as the monomer residence time.

The propylene-ethylene block copolymer of Invention I preferably has a weight-average molecular weight (Mw) of 100,000 or more, more preferably 180,000 or more, and particularly preferably 280,000 or more, in view of rigidity, tensile strength, tensile elongation, and impact resistance of final molded articles. Although there no particular upper limit of the molecular weight, the molecular weight is practically approximately some millions.

The propylene-ethylene block copolymer preferably has a molecular weight distribution index (Mw/Mn) of 3.5–15, and preferably 4.0–15.

In the propylene-ethylene block copolymer of Invention I, large amounts of the polypropylene segments and poly(ethylene-co-propylene) segments are linked chemically. Thus, the entire propylene-ethylene block copolymer has good compatibility, and a wide range of molecular weight distribution index can be attained. Such a block copolymer can be molded by means of a variety of conventional molding machines.

However, when the molecular weight distribution index is in excess of the aforementioned range, transparency and blushing resistance of the molded products decrease, whereas when the molecular weight distribution index is too low, flowability of the polymer during melting decreases, thereby deteriorating moldability.

The poly(ethylene-co-propylene) segment content of the propylene-ethylene block copolymer affects the physical properties of final molded products. Particularly, when the content is too low, impact resistance decreases, whereas when the content is excessively high, rigidity and tensile strength decrease. The poly(ethylene-co-propylene) segment content is not less than 5 wt. % and less than 100 wt. %, preferably 10–95 wt. %, and particularly preferably 10–90 wt. %.

The total ethylene content of the propylene-ethylene block copolymer is 2–95 wt. %, preferably 5–90 wt. %, more preferably 5–80 wt. %, and particularly preferably 10–70 wt. %.

The total ethylene content of the propylene-ethylene block copolymer also affects the physical properties of final molded products. When the content is low, impact resistance decreases, whereas when the content is high, transparency is prone to decrease.

The propylene-ethylene block copolymer of Invention I is produced through polymerization in the presence of an olefin polymerization catalyst comprising an organometallic compound and a solid catalyst component comprising either titanium and a halogen or titanium, magnesium, and a halogen. The obtained polypropylene segments contain no substantial 1–3 or 1–2 addition defect.

The component of the propylene-ethylene block copolymer that is soluble in xylene during extraction by use of xylene at 20° C. also affects the physical properties of final molded articles.

The content of the component soluble in xylene at 20° C. is 50 wt. % or less, preferably 40 wt. % or less, and more preferably 30 wt. % or less.

Particularly, when the content is excessively high, rigidity, impact resistance, tensile strength, and tensile elongation decrease, and mold-releasability during molding decreases, to thereby impart disadvantageous stickiness to molded articles.

Since large portions of the polypropylene segments and poly(ethylene-co-propylene) segments are linked chemically in the propylene-ethylene block copolymer of the present invention, the component soluble in xylene at 20° C. is contained in a small amount.

In addition, the content of the component insoluble in xylene at 20° C.; i.e., the poly(ethylene-co-propylene) segment content remaining after extraction or the total ethylene content, is almost constant.

The ratio of the remaining (after extraction/before extraction) poly(ethylene-co-propylene) segments is 50 wt. % or more, preferably 70 wt. % or more, and particularly preferably 80 wt. % or more. The ratio may be controlled to 90 wt. % or more.

The ratio of the total remaining (after extraction/before extraction) ethylene is 50 wt. % or more, preferably 70 wt. % or more, and particularly preferably 80 wt. % or more. The ratio may be controlled to 90 wt. % or more.

The propylene-ethylene block copolymer has an elution-completion temperature in cross-fractionation chromatography of 100–120° C., and preferably 105–120° C.

When the propylene-ethylene block copolymer is fixed in a column and the fixed polymer is eluted by use of o-dichlorobenzene (ODCB) through temperature-raising elution for fraction (TREF), a component having low crystallinity and a low melting point is eluted faster and a component having high crystallinity and a high melting point is successively eluted.

By measuring, through GPC, the weight-average molecular weight of each of the fractions which have been obtained through elution at a certain temperature range (e.g., 2° C.), a readily-soluble component (i.e., rubber component) to a difficult-to-solve component (i.e., crystalline component) corresponding to the elution temperature range, the weight-average molecular weight distribution thereof and the relationship between amounts of the two components can be obtained. If required, the ethylene/propylene compositional ratio can be observed by means of an apparatus such as an infrared spectrometer.

When the molecular weight-elution temperature data of cross-fractionation chromatography are expressed as a bird's eye view or a contour line differentiation, conventional block copolymers and polymer blends—multi-component mixtures—exhibit separated peaks according to a rubber component and a crystalline component are observed (when the mixture comprises two components, two separated peaks are observed in the distribution).

In contrast, the propylene-ethylene block copolymer of the present invention exhibits a single-peak (or continuous double-peak) distribution in the temperature range of a low elution temperature to a high elution temperature, and the elution-completion temperature is shifted to a lower temperature. The results indicate that the propylene-ethylene block copolymer of the present invention is formed of a single component.

Since, in the propylene-ethylene block copolymer of Invention I, large amounts the polypropylene segments and poly(ethylene-co-propylene) segments are linked chemically, the ethylene content of the eluted component of high molecular weight and that in the eluted component of low molecular weight are similar to each other. As a result, the entire propylene-ethylene block copolymer has high homogeneity and provides excellent balance in properties.

The propylene-ethylene block copolymer has a melting point (Tm) of 135° C. or higher, preferably 140° C. or higher, and particularly preferably 150° C. or higher.

When the Tm increases, mechanical strength and thermal strength are prone to increase.

When the Tm is less than 135° C., molded articles are disadvantageously sticky.

The propylene-ethylene block copolymer exhibits a melt flow rate (MFR: 10-minute discharge weight (g) from a nozzle (2.095 mm in diameter and 8 mm in length) at 230° C., load 2.16 kgf) of 0.1–1,000, and preferably 0.5–500.

When the MFR is small, flowablity decreases, whereas when MFR is excessively high, mechanical strength decreases.

The propylene-ethylene block copolymer exhibits a melt tension (at 190° C., capillary diameter 2.095 mm, extrusion speed 20 mm/min, winding speed 40 rpm) of 1.0 g or more, preferably 1.5 g or more, and particularly preferably 2.0 g or more. Such block copolymers preferably exhibiting a melt tension which cannot be measured under these conditions can also be obtained.

The peak temperature of complex modulus loss tangent (tan$\delta$) based on glass transition temperature of the PP portion of the propylene-ethylene block copolymer falls within the range of −50° C. to 10° C., preferably −40° C. to 8° C., and more preferably −30° C. to 6° C.

When the above tan$\delta$ peak temperature is higher than 10° C., transparency and blushing resistance decrease.

Conventional propylene-ethylene block copolymers exhibit a clear peak (tan$\delta$) attributed to propylene-ethylene copolymer at approximately −50° C. (low temperature side) and a clear peak (glass transition temperature tan$\delta$) attributed to polypropylene at approximately 0° C. (high temperature side). The two peaks are clearly separated.

In contrast, the propylene-ethylene block copolymer of the present invention exhibits a clear peak (tan$\delta$) attributed to propylene-ethylene copolymer segments (low temperature side) at a temperature higher than the conventionally observed peak temperature and a clear peak (tan$\delta$) attributed to polypropylene segments (high temperature side) at a temperature lower than the conventionally observed peak temperature. Thus, separation of the two peaks is unclear.

The results indicate that, in contrast to conventional propylene-ethylene block copolymers, polypropylene segments and poly(ethylene-co-propylene) segments are linked chemically in the block copolymer of the present invention.

The propylene-ethylene block copolymer exhibits a storage modulus (E') at 150° C. of $(0.1–30) \times 10^7$ dyne/cm$^2$, preferably $(0.2–25) \times 10^7$ dyne/cm$^2$, and particularly preferably $(0.3–20) \times 10^7$ dyne/cm$^2$.

When the aforementioned E' is less than $0.1 \times 10^7$ dyne/cm$^2$, heat resistance decreases, whereas when it is in excess of $30 \times 10^7$ dyne/cm$^2$, impact resistance decreases.

The E' of the propylene-ethylene block copolymer of the present invention decreases approximately in proportion to the increase in propylene-ethylene copolymer segments. That is, an additive property is observed.

Conventionally, in order to produce soft propylene-ethylene block copolymer material, the propylene-ethylene copolymer content has been elevated. In order to attain a further flexibility of the material, a variety of elastomers are blended. However, blending cannot necessarily provide complete dispersion. When a small amount of elastomer is blended to a propylene-ethylene block copolymer, a hard polypropylene phase serves as a matrix and an elastomer phase takes a so-called "domain" structure, whereas when the amount is large, the role of the phases are inverted; i.e., the soft elastomer phase serves as a matrix and the hard polypropylene phase takes a "domain" structure. Accordingly, E' drastically decreases. That is, no additive property is observed.

The propylene-ethylene block copolymer of the present invention does not exhibit drastic decrease in E', even when the copolymer content increases to approximately 90%.

The propylene-ethylene block copolymer of the present invention itself can provide a hard material and a soft material without a blending step. The components of the block copolymer are micro-dispersed during the production stage, to thereby attain a favorable dispersion state. Thus, propylene-ethylene block copolymers having a desired E' can be easily designed, As described above, results indicate that, in the propylene-ethylene block copolymer of the present invention, the polypropylene segments and the poly(ethylene-co-propylene) segments are linked via a chemical bond (covalent bond).

In the present invention, propylene-ethylene block copolymers having a desired E' can easily designed on the basis of the aforementioned proportional relationship.

The propylene-ethylene block copolymer has a flexural modulus of 50–1,400 MPa, preferably 50–1,300 MPa, and particularly preferably 100–1,200 MPa.

When the flexural modulus is below the aforementioned range, heat resistance decreases, whereas when the flexural modulus is above the range, impact resistance becomes poor.

The propylene-ethylene block copolymer has tensile yield strength of 5–40 MPa, preferably 5–35 MPa, and particularly preferably 5–30 MPa.

When the tensile yield strength is below the aforementioned range, heat resistance decreases, whereas when heat resistance is above the range, impact resistance becomes poor.

The propylene-ethylene block copolymer has an elongation at breakage of 100% or more, preferably 200% or more, and particularly preferably 300% or more.

When the elongation is below the aforementioned range, mechanical strength of material produced therefrom becomes poor.

The propylene-ethylene block copolymer has an Izod impact strength at 20° C. of 1.5 kJ/m² or more, preferably 2.0 kJ/m² or more, and particularly preferably 2.5 kJ/m² or more.

When the Izod impact strength is below the aforementioned range, impact strength at low temperatures becomes poor.

The propylene-ethylene block copolymer has a haze of 90% or less, preferably 85% or less, and particularly preferably 80% or less.

When the haze exceeds the aforementioned range, transparency becomes poor.

The propylene-ethylene block copolymer has a transparency of 15% or more, preferably 20% or more, and particularly preferably 25% or more.

When the transparency is below the aforementioned range, perspective property becomes poor.

Preferably, no blushing of the propylene-ethylene block copolymer is visually observed at 300% elongation. Particularly preferably, no blushing is visually observed at 500% elongation.

The diameter of a blush spot formed in the propylene-ethylene block copolymer as a result of a load dropping there onto is 10 mm or less, and preferably 1 mm or less. Particularly preferably, no blush spot is formed.

In Inventions I to III, a variety of additives, synthetic resins, or similar materials may be added in accordance with needs so long as the effects of the present invention are not impaired. Examples of the additives include a thermal stabilizer, an anti-oxidant, a UV-absorber, an antistatic agent, a nucleating agent, a lubricant, a flame-retardant agent, an anti-blocking agent, a colorant, and organic and inorganic fillers. These additives and synthetic resins may be added singly or in combination of two or more species. In order to prepare pellets for molding, there is carried out a method involving kneading a predetermined amount of a mixture of the propylene-ethylene-block copolymer of the present invention I and optional additives by means of a mixer such as a ribbon blender, a tumbler mixer, a Henschel mixer (trade name), or a super mixer, and pelletizing by melt-kneading by means of a roll, a Banbury mixer, an extruder, or a similar apparatus.

The thus-produced polypropylene-b-poly(ethylene-co-propylene) of Invention I can undergo a molding process; i.e., any of injection molding, compression molding, vacuum molding, blow molding, extrusion molding, film formation, film formation, sheet formation, and spinning.

Molded articles obtained from such a block copolymer having a low poly(ethylene-co-propylene) content have an excellent balance among transparency, blushing resistance, tensile strength, tensile elongation, and heat resistance, and are suitable for articles such as interior material of automobiles, domestic electric appliances, articles for daily use, and containers.

In addition, molded articles obtained from such a block copolymer having a high poly(ethylene-co-propylene) content can serve as articles having excellent transparency, blushing resistance, and flexibility as well as excellent impact strength and mechanical strength.

Molded articles obtained from the resin according to Invention I have a flexural modulus of 50–1,400 MPa, and preferably 50–1300 MPa.

Molded articles obtained from the resin according to Invention I have a tensile strength of 5–40 MPa, and preferably 5–35 MPa.

Molded articles obtained from the resin according to Invention I have an elongation at breakage of 100% or more, and preferably 200% or more.

Molded articles obtained from the resin according to Invention I have an Izod impact strength of 1.5 kJ/m² or more, and preferably 2.0 kJ/m².

Molded articles obtained from the resin according to Invention I have a haze of 90% or less, and preferably 85% or less.

Molded articles obtained from the resin according to Invention I have a transparency of 15% or more, and preferably 20% or more.

Molded articles obtained from the resin according to Invention I preferably exhibit no blushing when subjected to elongation.

Molded articles obtained from the resin according to Invention I have a blush spot of 10 mm diameter or less. Preferably, no blush spot is formed.

Secondly, Invention II (blushing-resistant transparent polypropylene resin for molding and molded articles therefrom) will be described in detail.

The poly(ethylene-co-propylene) segment content of the polypropylene-b-poly(ethylene-co-propylene) according to Invention II affects the physical properties of final molded products. Particularly, when the content is too low, impact resistance decreases, whereas when the content is excessively high, rigidity and tensile strength decrease. The poly(ethylene-co-propylene) segment content is at least 5 wt. % and less than 50 wt. %, and preferably not less than 10 wt % and less than 50 wt. %.

The total ethylene content of the polypropylene-b-poly (ethylene-co-propylene) is 0.25–47.5 wt. %, preferably 0.3–47 wt. %, more preferably 0.5–45 wt. %, and particularly preferably 1–40 wt. %.

The total ethylene content of the poly(ethylene-co-propylene) segments also affects the physical properties of final molded products. Particularly, when the content is too low, impact resistance decreases, whereas when the content is excessively high, transparency decreases. The ethylene content of the poly(ethylene-co-propylene) segments is 5–95 wt. %, preferably 10–90 wt. %, and particularly preferably 20–80 wt. %.

The polypropylene-b-poly(ethylene-co-propylene) has a weight-average molecular weight (Mw) of 30,000 or more, preferably 50,000 or more, and particularly preferably 100,000 or more, in view of effects on rigidity, tensile strength, tensile elongation, and impact resistance of final molded articles. Although no particular upper limit is imposed on molecular weight, the molecular weight is practically approximately some millions.

Although no particular limitation is imposed on the molecular weight distribution index (Mw/Mn) of the polypropylene-b-poly(ethylene-co-propylene), the index is generally 15 or less, and preferably 3.5–10. When the molecular weight distribution index is excessive, obtained molded products have poor transparency and blushing resistance, whereas when the index is too low, flowability of the molded products decreases.

The polypropylene-b-poly(ethylene-co-propylene) has a melting point (crystal-melting peak temperature) (Tm) of 135° C. or higher, preferably 140° C. or higher, and particularly preferably 150° C. or higher.

When the Tm increases, mechanical strength and thermal strength are prone to increase.

When the Tm is less than 135° C., molded articles are disadvantageously sticky.

The component of the polypropylene-b-poly(ethylene-co-propylene) that is soluble in xylene during extraction by use of xylene at 20° C. also affects the physical properties of final molded articles. Particularly, when the content is excessively high, rigidity, impact resistance, tensile strength, and tensile elongation decrease, and mold-releasability during molding decreases, to thereby impart disadvantageous stickiness to molded articles. Thus, the content of the component soluble in xylene during extraction by use of xylene at 20° C. is preferably 50 wt. % or less, and more preferably 40 wt. % or less.

Particularly, when the content is excessively high, rigidity, impact resistance, tensile strength, and tensile elongation decrease, and mold-releasability during molding decreases, to thereby impart disadvantageous stickiness to molded articles.

Since large portions of the polypropylene segments and poly(ethylene-co-propylene) segments are linked chemically in the propylene-ethylene block copolymer of Invention II, the component soluble in xylene at 20° C. is contained in a small amount.

In addition, the content of the component insoluble in xylene at 20° C.; i.e., the poly(ethylene-co-propylene) segment content remaining after extraction or the total ethylene content, is almost constant.

The ratio of the remaining (after extraction/before extraction) poly(ethylene-co-propylene) segments is 50 wt. % or more, preferably 70 wt. % or more, and particularly preferably 80 wt. % or more. The ratio may be controlled to 90 wt. % or more.

The ratio of the total remaining (after extraction/before extraction) ethylene is 50 wt. % or more, preferably 70 wt. % or more, and particularly preferably 80 wt. % or more. The ratio may be controlled to 90 wt. % or more.

The thus-produced blush-resistant transparent polypropylene resin for molding according to Invention II can undergo a molding process; i.e., any of injection molding, compression molding, vacuum molding, blow molding, extrusion molding, film formation, sheet formation, and spinning. The thus-obtained molded articles have an excellent balance among transparency, blushing resistance, tensile strength, tensile elongation, and heat resistance, and are suitable for articles such as interior material of automobiles, domestic electric appliances, articles for daily use, and containers.

Molded articles obtained from the resin according to Invention II have a flexural modulus of 400–1,400 MPa, and preferably 500–1,300 MPa.

Molded articles obtained from the resin according to Invention II have a tensile strength of 10–35 MPa, and preferably 15–30 MPa.

Molded articles obtained from the resin according to Invention II have an elongation at breakage of 100% or more, and preferably 200% or more.

Molded articles obtained from the resin according to Invention II have Izod impact strength of 2.5 kJ/m$^2$ or more, and preferably 3.0–30 kJ/m$^2$.

Molded articles obtained from the resin according to Invention II have a haze of 80% or less, and preferably 70% or less.

Molded articles obtained from the resin according to Invention II have a transparency of 25% or more, and preferably 30% or more.

Molded articles obtained from the resin according to Invention II preferably exhibit no blushing due to 300% elongation.

Molded articles obtained from the resin according to Invention II have a diameter of a blush spot 10 mm or less, and preferably 0.5 mm or less.

Thirdly, Invention III (elastomer for molding and molded articles therefrom) will be described in detail.

The poly(ethylene-co-propylene) segment content of the polypropylene-b-poly(ethylene-co-propylene) according to Invention III affects the physical properties of final molded products. Particularly, when the content is too low, flexibility decreases, whereas when the content is excessively high, rigidity and tensile strength decrease. The poly(ethylene-co-propylene) segment content is 50–99 wt. %, and preferably 50–95 wt. %.

The total ethylene content of the polypropylene-b-poly(ethylene-co-propylene) is 2.5–98 wt. %, preferably 3–95 wt. %, more preferably 5–90 wt. %, and particularly preferably 10–80 wt. %.

The total ethylene content of the poly(ethylene-co-propylene) segments also affects the physical properties of final molded products. Particularly, when the content is too low, flexibility and impact resistance decrease, whereas when the content is excessively high, flexibility decreases. The ethylene content of the poly(ethylene-co-propylene) segments is 5–99 wt. %, preferably 10–90 wt. %, and particularly preferably 20–80 wt. %.

The polypropylene-b-poly(ethylene-co-propylene) has a weight-average molecular weight (Mw) of 30,000 or more, more preferably 50,000 or more, and particularly preferably 100,000 or more, in view of effects on rigidity, tensile strength, and impact resistance of final molded articles. Although no particular upper limit is imposed on the molecular weight, the molecular weight is practically approximately some millions.

Although no particular limitation is imposed on the molecular weight distribution index (Mw/Mn) of the polypropylene-b-poly(ethylene-co-propylene), the index is generally 15 or less, and preferably 3.5–10. When the molecular weight distribution index is excessive, obtained molded products have poor transparency and blushing resistance, whereas when the index is too low, flowability of the molded products decreases, thereby reducing moldability.

The component of the polypropylene-b-poly(ethylene-co-propylene) that is soluble in xylene during extraction by use of xylene at 20° C. also affects the physical properties of final molded articles. Particularly, when the content is excessively high, rigidity and tensile strength decrease, and mold-releasability during molding decreases, to thereby impart disadvantageous stickiness to molded articles. Thus, the content of the component soluble in xylene at 20° C. is preferably 50 wt. % or less, and more preferably 40 wt. % or less.

Since large portions of the polypropylene segments and poly(ethylene-co-propylene) segments are linked chemically in the propylene-ethylene block copolymer of Invention III, the component soluble in xylene at 20° C. is contained in a small amount.

In addition, the content of the component insoluble in xylene at 20° C.; i.e., the poly(ethylene-co-propylene) segment content remaining after extraction or the total ethylene content, is almost constant.

The ratio of the remaining (after extraction/before extraction) poly(ethylene-co-propylene) segments is 50 wt.

% or more, preferably 70 wt. % or more, and particularly preferably 80 wt. % or more. The ratio may be controlled to 90 wt. % or more.

The ratio of the total remaining (after extraction/before extraction) ethylene is 50 wt. % or more, preferably 70 wt. % or more, and particularly preferably 80 wt. % or more. The ratio may be controlled to 90 wt. % or more.

The polypropylene-b-poly(ethylene-co-propylene) has a melting point (crystal-melting peak temperature) (Tm) of 135° C. or higher, preferably 140° C. or higher, and particularly preferably 150° C. or higher.

When the Tm increases, mechanical strength and thermal strength are prone to increase.

When the Tm is less than 135° C., molded articles are disadvantageously sticky.

Molded articles obtained from the resin according to Invention III have a flexural modulus of 100–500 MPa, and preferably 200–500 MPa.

Molded articles obtained from the resin according to Invention III have an elongation at breakage of 100% or more, and preferably 300% or more.

Molded articles obtained from the resin according to Invention III have an Izod impact strength (at 20° C.) of 6 kJ/m$^2$ or more, preferably 10 kJ/m$^2$ or more or do not break under testing conditions.

Molded articles obtained from the resin according to Invention III preferably exhibit no blushing due to 300% elongation.

The thus-produced elastomer according to Invention III can undergo a molding process; i.e., any of injection molding, compression molding, vacuum molding, blow molding, extrusion molding, film formation, sheet formation, and calendering, to thereby provide a variety of molded articles.

The elastomer for molding according to Invention III is a non-plastic elastomer and, therefore, can be used without incorporating material-characteristic-modifying additives such as ethylenic elastomer, styrenic elastomer, and hydrogenated products thereof.

EXAMPLES

The present invention will next be described in more detail by way of examples, which should not be construed as limiting the invention thereto.

Throughout the Examples and the Comparative Examples, the following evaluation methods were employed.

(1) Weight-average molecular weight (Mw) and molecular weight distribution index (Mw/Mn): a sample was dissolved in orthodichlorobenzene at 135° C., and the solution was subjected to measurement by use of a GPC apparatus (SSC7100: product of Senshu Chemical Co., Ltd.). The molecular weight distribution index (Mw/Mn) was calculated from the weight-average molecular weight (Mw) and the number-average molecular weight (Mn) through a customary method.

(2) Ethylene content (wt %): infrared absorption spectra (IR) and nuclear magnetic resonance (NMR) spectra were measured on copolymers of various polymer types having known ethylene contents; and on mixtures of polypropylene and polyethylene mixed in various mixing ratios, to thereby prepare a number of various calibration curves according to the polymerization type and to the ethylene content. An ethylene content of a sample was determined from area absorbance or line absorbance of the absorption band through a customary method in which a suitable calibration curve was employed.

The ethylene content of copolymer segments (EL: wt %) was calculated from the following equation:

EL (wt %)=total ethylene content (wt %)×100/(CO content)

wherein the CO content (wt %) is represented by the following formula:

CO content (wt %)=(amount of substances polymerized into copolymer segments)×100/{(amount of substances polymerized into polypropylene segments)+(amount of substances polymerized into copolymer segments)}

The content of poly(ethylene-co-propylene) segments (i.e.; CO content) may be determined through comparison of a latent heat of melting of polypropylene segments per unit sample weight with a latent heat of melting of isotactic polypropylene per unit weight (i.e.; 113 J/g). However, the calibration curve differs depending on the total ethylene content as well as on the polymer species. Thus, in a manner similar to that described above for total ethylene content measurement, a larger number of various calibration curves which correspond to various ranges of the total ethylene content and various polymerization types should be prepared. In accordance with needs, a sample may be treated with solvent so as to separate the sample into an extract and a residue, and the extract and the residue may be evaluated, respectively.

The latent heat of melting of the aforementioned polypropylene segments was measured in the following manner:

Apparatus: DSC (DSC Model 7: product of Perkin Elmer Corporation)

In order to provide the same heat history to each sample, each sample was heated to 200° C. at a heating rate of 10° C./min, and then maintained at 200° C. for 10 minutes, followed by cooling to −100° C. at a cooling rate of 10° C./min, and then the temperature was maintained at −100° C. for 10 minutes. Subsequently, each sample was heated to 200° C. at a heating rate of 10° C./min, to thereby yield a melting curve. The latent heat of melting of polypropylene segments, which corresponds to a peak in the range of 130–175° C., was determined.

(3) Amount extracted by xylene at 20° C. (wt %): each sample (0.1 g) was charged into a 1-liter beaker, and xylene (200 ml) was added thereto. The mixture was stirred for 5 hours at room temperature, followed by filtration through a Teflon membrane filter. The residue was dried under reduced pressure for 12 hours at 70° C., followed by weighing, to thereby determine the amount extracted.

The unextracted portion in the extraction procedure may be referred to as "extraction residue".

The copolymer content and the ethylene content (i.e.; total ethylene content) of each extraction residue were also determined.

(4) Haze and transparency: a sheet (thickness: 0.5 mm) which had been prepared through press forming of a melt at 200° C. was used. Haze and transparency of the sheet was measured in accordance with ASTM D1003 by use of Haze Guard Plus (product of Toyo Seiki Co., Ltd.).

(5) Tensile strength and elongation: tensile strength and elongation were measured in accordance with JIS K6758 at a pulling speed of 50 mm/min.

(6) Flexural modulus: flexural modulus was determined in accordance with JIS K6758 at a bending speed of 1 mm/min with a distance between supporting points of 30 mm.

(7) Izod impact strength: Izod impact strength was determined in accordance with JIS K6758 at −40° C., −20° C., and 23° C., respectively. Specifically, the tests were performed at −20° C. under a load of 40 kg.

Test results concerning the present invention II were obtained through tests at −20° C. under a load of 40 kg.

Test results concerning the present invention III were obtained through tests at 23° C. under a load of 40 kg.

(8) Blushing through elongation: when each of the test pieces was elongated 300% on the tensile test, the test pieces were evaluated through visual observation in terms of the degree of blushing.

Evaluation standards are as follows: o (no blushing), Δ (slight blushing), and × (considerable blushing).

(9) Blushing through impact application: by use of DuPont impact tester (product of Toyo Seiki Co., Ltd.), a load was allowed to fall under the following conditions onto each molded flat plate sample (40×40×2.0 mm) prepared in the above-described manner. The diameter of a blush spot of the flat plate formed through the impact was measured.
Striker tip: 0.635 cmR
Table: 3.00 cmφ
Load: 500 g
Height from which the load falls: 500 cm Concerning the present invention II, flat plates (40×40×2 mm) were used.

Concerning the present invention III, flat plates (40×40×2 mm) were also used.

(10) MFR (g): MFR, i.e.; an amount of a resin that was extruded for a period of 10 minutes at 230° C. under a load of 2.16 kg, was determined in accordance with ASTM D1238.

(11) Tan δ and E':
Tan δ and E' were determined based on temperature dependency of the dynamic viscoelasticity.
Apparatus: DVE-V4-FT (product of Rheology Co., Ltd.)
Sample preparation: a press-formed sheet (melted at 200° C., cooled at 18° C.).
Sample size: 5 mm width, 0.2 mm thickness
Frequency for measurements: 10 Hz
Measurement mode: tensile
Strain: 0.05%
Heating rate: 3° C./min

(12) Elution completion temperature measurement through a cross fractional chromatography (CFC):
Apparatus: CFC T-150A (product of Dia Instruments Co., Ltd.)
Solvent: ODCB
Coating conditions: cooling time: 270 minutes (from 135° C. to 0° C.), cooling time: 30 minutes (0° C.)
Measurement starting temperature: 0° C.
Polymer content: 4 mg/ml
Elution fraction: 2° C.

(13) Melt tension:
Melt tension was determined by use of a melt tension tester (product of Toyo Seiki Co., Ltd.) at a resin heating temperature of 190° C., a capillary diameter of 2.095 mm, an extrusion rate of 20 mm/20 min, and a winding speed of 40 rpm.

The production method of the propylene-ethylene block copolymer according to the present invention, which is common among the present invention I to III, will be described.

[Production of propylene-ethylene Block Copolymer]

The propylene-ethylene block copolymer according to the present invention was produced in accordance with an exemplary method as shown in FIG. 9. However, the production method of the propylene-ethylene block copolymer according to the present invention is not particularly limited thereto.

In each of the Examples, the propylene-ethylene block copolymer according to the present invention was produced in the following manner by use of a chlorine-containing magnesium catalyst held on titanium.

<Preparatory Treatment> In container "A" were placed toluene, a toluene solution of triethylaluminum (product of Tosoh Akzo Corporation), an electron-donating compound such as an organic silicon compound (if necessary), and a chlorine-containing magnesium catalyst held on titanium ("THC-C catalyst": product of Toho Titanium Co., Ltd.: referred to as "Ti-on-Mg catalyst"). The components were brought into contact with one another in advance through mixing for three minutes at 30° C. The Al/Ti mole ratio was, for example, 3, and the Si/Ti mole ratio was, for example, 1.

<Polymerization> In container "B" were placed toluene, a toluene solution of triethylaluminum, and propylene; and in container "C" were placed a mixture containing toluene, ethylene, and propylene. Containers "B" and "C" were maintained at 30° C. Isopropyl alcohol was placed in container "D", and was maintained at 15° C.

The temperatures of polymerization areas "a" and "b" were maintained at 25° C. Containers "A" to "C" were pressurized with nitrogen such that a predetermined retention time of reaction mass in the area "a" was attained. Polymerization was carried out, and the polymerization was stopped when a predetermined amount of the catalyst in container "A" had outflown.

After completion of polymerization reaction, the reaction mass was taken from container "D", and to the reaction mass, a 35% hydrochloric acid solution was added, followed by stirring for 24 hours. The produced polymer was filtered, and subjected to washing with isopropyl alcohol (1 L) three times, followed by further washing with ion-exchange water (1 L) three times. The washed polymer was filtered, and dried under reduced pressure at 60° C. for eight hours, to thereby yield a target block copolymer powder.

Examples of the present invention I will next be described.

Examples I-1 to I-8

First, the production method will be described in more detail by way of Example I-1 which serves as a representative example.

<Preparatory Treatment> In container "A" were placed toluene (1 L), a 2 mol/L toluene solution of triethylaluminum (30 ml), diisopropyldimethoxysilane (3.5 g; 0.02 mol: product of Chisso Corporation) serving as an organic silicon compound, and a chlorine-containing magnesium catalyst held on titanium (THC-C catalyst) (35 g), and the components were brought into contact with one another in advance through mixing at 30° C. for three minutes. The Al/Ti mole ratio was 3, and the Si/Ti mole ratio was 1.

<Polymerization> In container "B" were placed toluene (200 ml), a 2 mol/L toluene solution of triethylaluminum (240 ml), and propylene (300 g; 7.1 mol); and in container "C" were placed toluene (900 ml), ethylene (15 g; 0.5 mol), and propylene (35 g; 0.8 mol). Containers "B" and "C" were maintained at 30° C. Isopropyl alcohol (5 L) was placed in container "D", and was maintained at 15° C.

The polymerization areas "a" (tube length: 2 m) and "b" (tube length: 25 cm) were maintained at 25° C. Containers "A" to "C" were pressurized with nitrogen such that the retention times of reaction mass in the area "a" and the area "b" were 0.6 seconds and 0.15 seconds, respectively. Polymerization was carried out, and the polymerization reaction was stopped when the catalyst in container "A" had outflown in an amount of 20 g to 25 g.

After completion of polymerization reaction, the reaction mass was taken from container "D", and to the reaction mass, a 35% hydrochloric acid solution (100 ml) was added, followed by stirring for 24 hours. The produced polymer was filtered, and subjected to washing with isopropyl alcohol (1 L) three times, followed by further washing with ion-exchange water (1 L) three times. The washed polymer was filtered, and dried under reduced pressure at 60° C. for eight hours, to thereby yield 39.3 g of a target block copolymer powder.

The weight-average molecular weight, the copolymer content, and the total ethylene content of the resultant block copolymer were determined to be 290,000, 13.5 wt %, and 3.5 wt %, respectively. The catalytic activity per second for producing the block copolymer was determined to be 2.6 g/g-catalyst ("catalyst" here refers to a solid catalyst).

In each of Example I-2 to I-8, the polymerization procedure described in Example I-1 was repeated, except that the tube length, the retention time, the polymerization temperature, the amount of propylene to be polymerized, and the propylene/ethylene ratio were varied.

Physical properties of the resultant propylene-ethylene block copolymer are shown in (a)–(h) of Table I-1.

Comparative Examples I-1 to 6

The following substances were employed in the Comparative Examples. All substances are products of Chisso Petrochemical Corporation. Physical properties of these substances are shown in Table I-1.
(i) crystalline propylene homopolymer
(j) propylene-ethylene random copolymer having an ethylene content of 2.5 wt %
(k) propylene-ethylene-butene random copolymer having an ethylene content of 3.1 wt % and a butene content of 2.5 wt %
(l) conventional propylene-ethylene block copolymer prepared in the following manner: polypropylene segments were firstly prepared through polymerization, and the polypropylene segments (86 wt %) were polymerized with copolymer segments (14 wt %)
(m) conventional propylene-ethylene block copolymer prepared in the following manner: polypropylene segments were firstly prepared through polymerization, and the polypropylene segments (81 wt %) were polymerized with copolymer segments (19 wt %)
(n) random block copolymer prepared in the following manner: a propylene-ethylene random copolymer (ethylene content: 1.5 wt %) was firstly prepared through polymerization, and the random copolymer (88 wt %) was polymerized with the other propylene-ethylene random copolymer (12 wt %). The latter propylene-ethylene random copolymer, which was incorporated in a proportion of 12 wt %, has an ethylene content of 45 wt %.

[Physical Properties of Molded Articles]

Phenolic heat stabilizer (0.03 g) and calcium stearate (0.03 g) were added to 30 g each of the powdery resins obtained from Examples I-1 to I-8 and Comparative Examples I-1 to I-6, and the mixture was mixed for 10 minutes at room temperature by use of a mixer (Micro-Type S-3 See-Through-Type Mixer: product of Tsutsui Rika Kagaku Kikai Co., Ltd.). The thus-obtained mixture was kneaded and pelletized by use of a small-sized kneading extruder (CSI-max Mixing Extruder Model 194AV: product of Toyo Seiki Co., Ltd.) at a cylinder temperature of 200° C. and a die temperature of 200° C.

Figure 1:
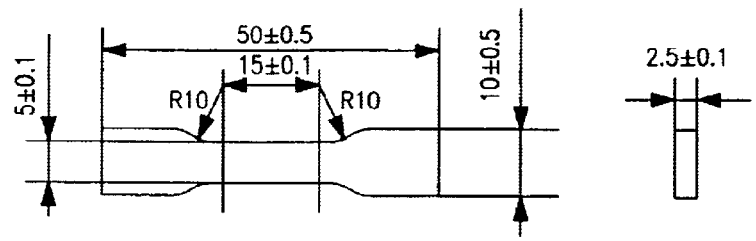
FIG. 1 shows dimensions of small test pieces for measuring physical properties according to the present invention.
Figure 1:
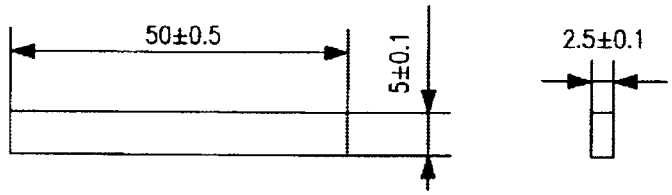
Figure 1:
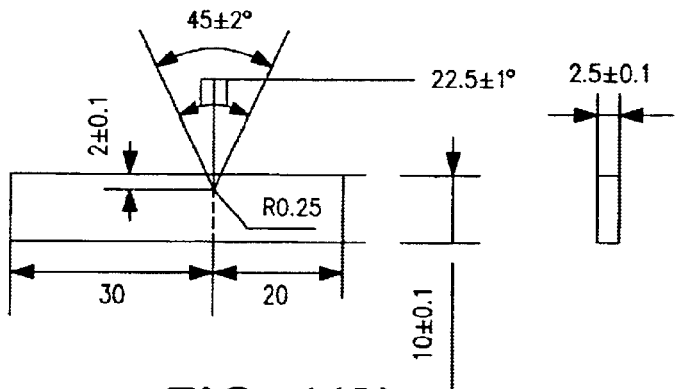
Figure 1:
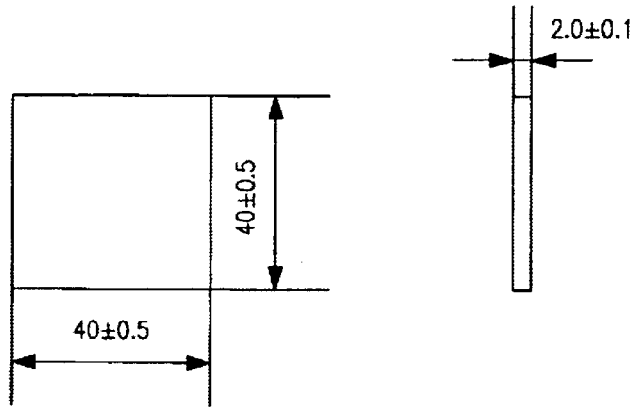

The pellets obtained in the above-described manner were injection molded into small test pieces (see FIG. 1) by use of a small-sized injection molding machine (CS-Minimax Molder Model CS-183MMX: product of Toyo Seiki Co., Ltd.) at a melt temperature of 200° C., a rotational speed of 200 rpm, and a mold temperature of 18° C. The test pieces were preconditioned in a thermostatic chamber at a humidity of 50% and a chamber temperature of 23° C. for 72 hours.

The thus-obtained test pieces were evaluated in terms of appearance and the physical properties in accordance with the aforementioned procedures. The results are shown in Table I-1.

In the Examples and the Comparative Examples, each molded article was formed with a resin which serves as the sole component. A molded article formed in accordance with the Example is superior to those of the Comparative Examples in terms of the overall balancing of physical properties, particularly in terms of properties such as transparency, blushing through elongation, diameter of the blush spot, and elongation at break.

TABLE I-1

| | Ex. I-1 | Ex. I-2 | Ex. I-3 | Ex. I-4 | Ex. I-5 | Ex. I-6 | Ex. I-7 | Ex. I-8 | Comp. Ex. I-1 | Comp. Ex. I-2 | Comp. Ex. I-3 | Comp. Ex. I-4 | Comp. Ex. I-5 | Comp. Ex. I-6 |
|---|---|---|---|---|---|---|---|---|---|---|---|---|---|---|
| Type | (a) | (b) | (c) | (d) | (e) | (f) | (g) | (h) | (i) | (j) | (k) | (l) | (m) | (n) |
| Mw (×$10^4$) | 29 | 30 | 28 | 45.8 | 34 | 34 | 12 | 9.5 | 25 | 23 | 23 | 30 | 30 | 31 |
| Mw/Mn | 9.9 | 13.0 | 5.9 | 9.5 | 6.6 | 8.4 | 4.2 | 12.0 | — | — | — | — | — | — |
| CO (%) | 13.5 | 20.4 | 42.7 | 43.6 | 68.1 | 80.5 | 64.1 | 54.7 | 0 | 100 | 100 | 14.0 | 19.0 | 12.0 |
| EL (%) | 3.5 | 6.8 | 14.4 | 14.3 | 21.5 | 21.5 | 22.7 | 21.6 | 0 | 2.5 | 3.1*1 | 7.5 | 9.0 | 5.4 |
| XLsolb (%) | 6.6 | 3.0 | 3.6 | 1.4 | 12.4 | 17.7 | 23.1 | 26.6 | 0.7 | 0.8 | 0.8 | 7.0 | 8.3 | 5.9 |
| CO remaining after extraction (%) | 14.0 | 21.5 | 40.5 | 45.7 | 58.0 | 63.3 | 53.0 | 45.5 | 0 | 100 | 100 | 4.2 | 5.7 | 3.5 |
| EL remaining after extraction (%) | 3.6 | 7.2 | 15.0 | 14.2 | 20.1 | 18.9 | 21.0 | 20.3 | 0 | 2.4 | 2.8 | 2.5 | 3.0 | 2.0 |
| Elution completion temperature (° C.) | 120 | 120 | 115 | 115 | 110 | 110 | 112 | 110 | 120 | 106 | 106 | 120 | 120 | 120 |
| Tm (° C.) | 159.4 | 159.4 | 160.9 | 160.8 | 158.5 | 155.2 | 157.5 | 158.5 | 161.0 | 138 | 135 | 160 | 160 | 145 |
| MFR | 2.1 | 1.9 | 2.0 | 1.0 | 1.8 | 2.0 | 25 | 200 | 6.0 | 8.0 | 7.0 | 2.5 | 2.5 | 2.0 |
| tan$\delta$ peak temperature (° C.) | 6.0 | 3.0 | 2.7 | 2.8 | −0.5 | −0.4 | −3.1 | −0.4 | 14.9 | 8.9 | 8.7 | 11.8 | 14.7 | 8.8 |

TABLE I-1-continued

| | Ex. I-1 | Ex. I-2 | Ex. I-3 | Ex. I-4 | Ex. I-5 | Ex. I-6 | Ex. I-7 | Ex. I-8 | Comp. Ex. I-1 | Comp. Ex. I-2 | Comp. Ex. I-3 | Comp. Ex. I-4 | Comp. Ex. I-5 | Comp. Ex. I-6 |
|---|---|---|---|---|---|---|---|---|---|---|---|---|---|---|
| E' | 16.1 | 4.9 | 5.1 | 3.0 | 1.4 | 1.2 | 0.7 | 0.5 | 56.1 | 0.3 | 0.4 | 26.3 | 22.6 | 2.5 |
| Melt tension (g) | 2.3 | 2.4 | 2.3 | 3.0 | 2.4 | 2.3 | Not measured | | 1.2 | 1.0 | 1.1 | 2.1 | 2.0 | 1.8 |
| Physical properties of product | | | | | | | | | | | | | | |
| Flexural modulus | 961 | 695 | 470 | 458 | 260 | 146 | 132 | 206 | 1400 | 798 | 767 | 838 | 720 | 711 |
| Tensile strength | 27.5 | 22.9 | 17.8 | 19.2 | 12.1 | 9.5 | 6.8 | 8.1 | 33.7 | 25.3 | 24.8 | 24.6 | 22.0 | 21.0 |
| Elongation at break | 430 | 400 | 410 | 447 | 420 | 435 | 350 | 320 | 410 | 430 | 440 | 340 | 342 | 440 |
| Iz impact strength | 3.8 | 7.2 | 15.4 | 26.4 | NB | NB | NB | 14.0 | 2.3 | 2.7 | 2.8 | 9.9 | 13.7 | 11.3 |
| Haze (%) | 65.4 | 63.8 | 66.0 | 73.0 | 70.0 | 72.3 | 65.5 | 70.0 | 76.8 | 63.2 | 64.7 | 92.3 | 93.8 | 86.1 |
| Transparency (%) | 55.5 | 53.6 | 53.5 | 50.8 | 40.0 | 38.0 | 45.0 | 40.0 | 14.5 | 21.4 | 22.6 | 13.7 | 12.5 | 17.6 |
| Blushing by tensile | ○ | ○ | ○ | ○ | ○ | ○ | ○ | ○ | X | Δ | Δ | X | X | X |
| Diameter of impact-blush spot | 0 | 0 | 0 | 0 | 0 | 0 | 0 | 0 | 0 | 0 | 0 | 15 | 15 | 10 |

CO: Poly(ethylene-co-propylene) segment content (wt. %) in each propylene-ethylene block copolymer of the present invention or ethylene-propylene copolymer content (wt %) in each conventional propylene-ethylene block copolymer;
EL: Ethylene content (wt. %) in each propylene-ethylene block copolymer of the present invention or each conventional propylene-ethylene block copolymer;
Mw: Weight-average molecular weight;
Mw/Mn: Molecular weight distribution index;
XLsolb: Content (wt. %) of component soluble in xylene at 20° C.;
Tm: Crystal melting peak temperature (° C.);
MFR: Amount (g/10 min) of discharged molten resin at 230° C. with 2.16-kg load;
$\tan^\delta$ peak temperature: Peak temperature (° C.) of loss tangent of PP portion on the basis of glass transition temperature;
E': Storage modulus at 150° C. ($\times 10^7$ dyne/cm$^2$);
Flexural modulus (MPa);
Tensile strength (MPa);
Elongation at break (%)
Iz impact strength: Izod impact strength at −20° C. (kJ/m$^2$);
NB: Not broken;
Diameter of impact-blush spot (mm);
*1: Containing ethylene (3.1 wt. %) and butene (2.5 wt. %);
Melt tension: Measured by melt tension tester (product of Toyo Seiki) at 190° C. and under the conditions: capillary diameter 2.095 mm, extrusion speed 20 mm/min, and rolling speed 40 rpm Industrial Applicability of the Present Invention I A propylene-ethylene block copolymer according to the present invention I, which served as the sole component, could provide a molded article which was endowed with well-balanced tensile strength, elongation, impact resistance, and heat resistance, while exhibiting superior transparency and superior blushing resistance.

The propylene-ethylene block copolymer according to the present invention I may be used for injection molding, compression molding, vacuum molding, blow molding, extrusion molding, film forming, sheet forming, or spinning. The produced mold article is endowed with well-balanced transparency, blushing resistance, tensile strength, elongation, and heat resistance, and is suitable for applications such as interior material for automobiles, domestic electric appliances, daily necessaries, and various containers.

Examples of the present invention II will next be described.

The blushing-resistant, transparent, polypropylene-containing resins employed for Examples of the present invention II are as follows.
(B) polypropylene-b-poly(ethylene-co-propylene)
(a) weight-average molecular weight (Mw)=300,000; molecular weight distribution index (Mw/Mn)=6.0; content of poly(ethylene-co-propylene) segments=9.1 wt %; ethylene content=3.5 wt %
(b) weight-average molecular weight (Mw)=300,000; molecular weight distribution index (Mw/Mn)=6.0; content of poly(ethylene-co-propylene) segments=20.4 wt %; ethylene content=6.8 wt %
(c) weight-average molecular weight (Mw)=280,000; molecular weight distribution index (Mw/Mn)=5.9; content of poly(ethylene-co-propylene) segments=46.3 wt %; ethylene content=14.4 wt %

The production method will next be described in more detail by way of a representative example in which polypropylene-b-poly(ethylene-co-propylene) (a) for Example II-1 was produced.
<Preparatory Treatment> In container "A" were placed toluene (1 L), a 2 mol/L toluene solution of triethylaluminum (30 ml), diisopropyldimethoxysilane serving as an organic silicon compound (3.5 g; 0.02 mol) (product of Chisso Corporation), and a chlorine-containing magnesium catalyst held on titanium (THC-C catalyst) (35 g), and the components were brought into contact with one another in advance through mixing at 30° C. for three minutes. The Al/Ti mole ratio was 3, and the Si/Ti mole ratio was 1.
<Polymerization> In container "B" were placed toluene (200 ml), a 2 mol/L toluene solution of triethylaluminum (240 ml), and propylene (300 g; 7.1 mol); and in container "C" were placed toluene (900 ml), ethylene (15 g; 0.5 mol), and propylene (35 g; 0.8 mol). Containers "B" and "C" were maintained at 30° C. Isopropyl alcohol (5 L) was placed in container "D", and was maintained at 15° C.

The polymerization areas "a" (tube length: 2 m) and "b" (tube length: 25 cm) were maintained at 25° C. Containers "A" to "C" were pressurized with nitrogen such that the retention times of reaction mass in the area "a" and area "b" were 0.6 seconds and 0.15 seconds, respectively. Polymerization was carried out, and the polymerization reaction was stopped when the catalyst in container "A" had outflown in an amount of 20 g to 25 g.

After completion of polymerization reaction, the reaction mass was taken from container "D", and to the reaction mass, a 35% hydrochloric acid solution (100 ml) was added, followed by stirring for 24 hours. The produced polymer was filtered, and subjected to washing with isopropyl alcohol (1 L) three times, followed by further washing with ion-exchange water (1 L) three times. The washed polymer was filtered, and dried under reduced pressure at 60° C. for eight hours, to thereby yield 38.5 g of a target block copolymer powder.

The weight-average molecular weight, the copolymer content, and the total ethylene content of the resultant block copolymer were determined to be 300,000, 9.1 wt %, and 3.5 wt %, respectively. The catalytic activity per second for producing the block copolymer was determined to be 2.6 g/g-catalyst ("catalyst" herein refers to a solid catalyst)

Each of the copolymers; i.e., polypropylene-b-poly(ethylene-co-propylene) (b) (in Example II-2) and the polypropylene-b-poly(ethylene-co-propylene) (c) (in Example II-3), was prepared in a manner similar to the polymerization process for (a) (in Example II-1), except that the tube length, the retention time, the polymerization temperature, the amount of propylene to be polymerized, and the propylene/ethylene ratio were varied.

In Comparative Examples for the present invention II, the following substances were employed for production of polypropylene-containing resin compositions.

(A) propylene-containing polymer
(O) polypropylene
  (a) crystalline propylene homopolymer (product of Chisso Petrochemical Corporation): weight-average molecular weight (Mw)=280,000; MFR=6 g/10 min (II) propylene-ethylene random copolymer
  (b) propylene-ethylene random copolymer (product of Chisso Petrochemical Corporation): weight-average molecular weight (Mw)=230,000; ethylene content=2.5 wt %; MFR=8 g/10 min
  (c) propylene-ethylene-butene random copolymer (product of Chisso Petrochemical Corporation): ethylene content=3.1 wt %; butene content=2.4 wt %; MFR=7 g/10 min (I) conventional propylene-ethylene block copolymer
  (d) propylene-containing block copolymer (product of Chisso Petrochemical Corporation): ethylene content=7.5 wt %; MFR=2.5 g/10 min
  (e) propylene-containing block copolymer (product of Chisso Petrochemical Corporation): ethylene content=9.0 wt %; MFR=2.5 g/10 min
  (f) propylene-containing block copolymer (product of Chisso Petrochemical Corporation): ethylene content=5.4 wt %; MFR=2.0 g/10 min Examples II-1 to II-3 and Comparative Examples II-1 to II-6

In each of Examples II-1 to II-3 and Comparative Examples II-1 to II-6, one of the above-described resins was employed as the sole component. The resin was pelletized in the following manner.

Phenolic heat stabilizer (0.03 g) and calcium stearate (0.03 g) were added to each of the above-described powdery resins (30 g), and the mixture was mixed for 10 minutes at room temperature by use of a mixer (Micro-Type S-3 See-Through-Type Mixer: product of Tsutsui Rika Kagaku Kikai Co., Ltd.). The thus-obtained mixture was kneaded and pelletized by use of a small-sized kneading extruder (CSI-Max Mixing Extruder Model 194AV: product of Toyo Seiki Co., Ltd.) at a cylinder temperature of 200° C. and a die temperature of 200° C.

The pellets obtained in the above-described manner were injection molded into small test pieces (see FIG. 1) by use of a small-sized injection molding machine (CS-Minimax Molder Model CS-183MMX: product of Toyo Seiki Co., Ltd.) at a melt temperature of 200° C. and a mold temperature of 18° C. The test pieces were preconditioned in a thermostatic chamber at a humidity of 50% and a chamber temperature of 23° C. for 72 hours.

The thus-obtained test pieces were evaluated in terms of appearance and the physical properties in accordance with the aforementioned procedures. The results are shown in Table II-1.

In each of the Examples and the Comparative Example, a resin was used as the sole component. The mold articles formed in accordance with the Examples are superior to those of the Comparative Examples in terms of properties such as elongation at break, transparency, blushing through elongation, and diameter of the blush spot.

TABLE II-1

|  | Ex. II-1 | Ex. II-2 | Ex. II-3 | Comp. Ex. II-1 | Comp. Ex. II-2 | Comp. Ex. II-3 | Comp. Ex. II-4 | Comp. Ex. II-5 | Comp. Ex. II-6 |
|---|---|---|---|---|---|---|---|---|---|
| (A) | — | — | — | | | | | | |
| (O) Type | | | | (a) | | | | | |
| Parts by weight | | | | 100 | | | | | |
| Mw (×10$^4$) | | | | 25 | | | | | |
| Tm (° C.) | | | | 161.0 | | | | | |
| MFR | | | | 6.0 | | | | | |
| (I) Type | | | | | | | (d) | (e) | (f) |
| Parts by weight | | | | | | | 100 | 100 | 100 |
| Mw (×10$^4$) | | | | | | | 30 | 30 | 31 |
| CO (%) | | | | | | | 14.0 | 19.0 | 12 |
| EL (%) | | | | | | | 7.5 | 9.0 | 5.4 |

TABLE II-1-continued

| | Ex. II-1 | Ex. II-2 | Ex. II-3 | Comp. Ex. II-1 | Comp. Ex. II-2 | Comp. Ex. II-3 | Comp. Ex. II-4 | Comp. Ex. II-5 | Comp. Ex. II-6 |
|---|---|---|---|---|---|---|---|---|---|
| Tm (° C.) | | | | | | | 161 | 161 | 136 |
| MFR | | | | | | | 2.5 | 2.5 | 2.0 |
| (II) Type | | | | | (b) | (c) | | | |
| Parts by weight | | | | | 100 | 100 | | | |
| Mw (×10$^4$) | | | | | 23 | 23 | | | |
| EL (%) | | | | | 2.5 | 3.1 | | | |
| BT (%) | | | | | | 2.4 | | | |
| Tm (° C.) | | | | | 136 | 133 | | | |
| MFR | | | | | 8.0 | 7.0 | | | |
| Type | (a) | (b) | (c) | | | | | | |
| Parts by weight | 100 | 100 | 100 | — | — | — | — | — | — |
| MW (×10$^4$) | 30 | 30 | 28 | | | | | | |
| Mw/Mn | 6.0 | 6.0 | 5.9 | | | | | | |
| CO (%) | 9.1 | 20.4 | 46.3 | | | | | | |
| EL (%) | 3.5 | 6.8 | 14.4 | | | | | | |
| XLsolb (%) | 10 | 6.6 | 15 | | | | | | |
| Tm (° C.) | 159.0 | 159.4 | 160.9 | | | | | | |
| MFR | 2.1 | 1.9 | 2.0 | | | | | | |
| Physical properties of product | | | | | | | | | |
| Flexural modulus | 961 | 695 | 467 | 1400 | 798 | 767 | 838 | 720 | 711 |
| Tensile strength | 27.5 | 22.9 | 17.8 | 33.7 | 25.3 | 24.8 | 24.6 | 22.0 | 21.0 |
| Elongation at break | 430 | 400 | 410 | 350 | 360 | 370 | 340 | 342 | 380 |
| Iz impact strength | 3.8 | 7.2 | 15.3 | 2.3 | 2.7 | 2.8 | 9.9 | 13.7 | 11.3 |
| Haze | 69.4 | 65.8 | 63.5 | 76.8 | 63.2 | 64.7 | 92.3 | 93.8 | 86.1 |
| Transparency | 55.5 | 53.6 | 53.5 | 14.5 | 21.4 | 22.6 | 13.7 | 12.5 | 17.6 |
| Blushing by tensile | ○ | ○ | ○ | X | Δ | Δ | X | X | X |
| Diameter of impact-blush Spot | 0 | 0 | 0 | 0 | 0 | 0 | 15 | 15 | 10 |

CO: Poly(ethylene-co-propylene) segment content (wt. %) in polypropylene-b-poly(ethylene-co-propylene);
EL: Ethylene content (wt. %) in polypropylene-b-poly(ethylene-co-propylene);
Mw: weight-average molecular weight; Mw/Mn: Molecular weight distribution index;
XLsolb: Content (wt. %) of component soluble in xylene at 20° C.;
Tm: Crystal melting peak temperature (° C.);
MFR: Amount (g/10 min) of discharged molten resin at 230° C. with 2.16-kg load; Flexural modulus (MPa); Tensile strength (MPa); Elongation at break (%)
Iz impact strength: Izod impact strength (kJ/m$^2$)

Industrial Applicability of the Present Invention II

According to the present invention II, a blushing-resistant, transparent, polypropylene-containing resin for molding, which served as the sole component, could provide a molded article which was endowed with well-balanced tensile strength, elongation, impact resistance, and heat resistance, while exhibiting superior transparency and superior blushing resistance.

The blushing-resistant, transparent, polypropylene-containing resin for molding according to the present invention II may be used for injection molding, compression molding, vacuum molding, blow molding, extrusion molding, film forming, sheet forming, or spinning. The thus-obtained mold article is endowed with well-balanced transparency, blushing resistance, tensile strength, elongation, and heat resistance, and is suitable for applications such as interior material for automobiles, domestic electric appliances, daily necessaries, and various containers.

Examples of the present invention III will next be described.

Examples III-1 to III-3 and Comparative Examples III-1 to III-4

The following moldable elastomers according to the present invention were employed in the Examples.
(B) polypropylene-b-poly(ethylene-co-propylene)
(a) weight-average molecular weight (Mw)=340,000; molecular weight distribution index (Mw/Mn)=6.6; content of poly(ethylene-co-propylene) segments=72.9 wt %; ethylene content=21.5 wt %

(b) weight-average molecular weight (Mw)=120,000; molecular weight distribution index (Mw/Mn)=4.0; content of poly(ethylene-co-propylene) segments=64.1 wt %; ethylene content=21.5 wt %

(c) weight-average molecular weight (Mw)=95,000; molecular weight distribution index (Mw/Mn)=12.0; content of poly(ethylene-co-propylene) segments=65.6 wt %; ethylene content=22.2 wt %

(d) weight-average molecular weight (Mw)=280,000; molecular weight distribution index (Mw/Mn)=6.5; content of poly(ethylene-co-propylene) segments=55.3 wt %; ethylene content=11.4 wt %

(e) weight-average molecular weight (Mw)=243,000; molecular weight distribution index (Mw/Mn)=4.7; content of poly(ethylene-co-propylene) segments=72.7 wt %; ethylene content=20.4 wt %

(f) weight-average molecular weight (Mw)=340,000; molecular weight distribution index (Mw/Mn)=8.4; content of poly(ethylene-co-propylene) segments=80.5 wt %; ethylene content=21.5 wt %

The production method will next be described in more detail by way of a representative example in which polypropylene-b-poly(ethylene-co-propylene) (a) for Example III-1 was produced.
<Preparatory Treatment> In container "A" were placed toluene (1 L), a 2 mol/L toluene solution of triethylaluminum (30 ml) diisopropyldimethoxysilane serving as an organic silicon compound (3.5 g; 0.02 mol) (product of Chisso Corporation), and a chlorine-containing magnesium catalyst held on titanium (THC-C catalyst) (35 g), and the components were brought into contact with one another in advance through mixing at 30° C. for three minutes. The Al/Ti mole ratio was 3, and the Si/Ti mole ratio was 1.

<Polymerization> In container "B" were placed toluene (200 ml), a 2 mol/L toluene solution of triethylaluminum (240 ml) and propylene (300 g; 7.1 mol); and in container "C" were placed toluene (900 ml), ethylene (15 g; 0.5 mol), and propylene (35 g; 0.8 mol). Containers "B" and "C" were maintained at 30° C. Isopropyl alcohol (5 L) was placed in container "D", and was maintained at 15° C.

The polymerization areas "a" (tube length: 50 cm) and "b" (tube length: 50 cm) were maintained at 25° C. Containers "A" to "C" were pressurized with nitrogen such that the retention times of reaction mass in the area "a" and area "b" were 0.3 seconds and 0.3 seconds, respectively. Polymerization was carried out, and the polymerization reaction was stopped when the catalyst in container "A" had outflown in an amount of 20 g to 25 g.

After completion of the polymerization reaction, the reaction mass was taken from container "D", and to the reaction mass, a 35% hydrochloric acid solution (100 ml) was added, followed by stirring for 24 hours, The produced polymer was filtered, and subjected to washing with isopropyl alcohol (1 L) three times, followed by further washing with ion-exchange water (1 L) three times. The washed polymer was filtered, and dried under reduced pressure at 60° C. for eight hours, to thereby yield 31.4 g of a target block copolymer powder.

The weight-average molecular weight, the copolymer content, and the total ethylene content of the resultant block copolymer were determined to be 340,000, 72.9 wt %, and 29.4 wt %, respectively. The catalytic activity per second for producing the block copolymer was determined to be 2.6 g/g-catalyst ("catalyst" herein refers to a solid catalyst).

Each of the copolymers; i.e., from polypropylene-b-poly (ethylene-co-propylene) (b) (in Example III-2) to the polypropylene-b-poly(ethylene-co-propylene) (f) (in Example III-6), was prepared in a manner similar to the polymerization process for (a) (in Example III-1), except that the tube length, the retention time, the polymerization temperature, the amount of propylene to be polymerized, the propylene/ethylene ratio were varied.

In the Examples, the above-described moldable elastomers were pelletized in the following manner.

Phenolic heat stabilizer (0.03 g) and calcium stearate (0.03 g) were added to each of the moldable powdery polypropylene-b-poly(ethylene-co-propylene) elastomer (30 g) according to the present invention, and the mixture was mixed for 10 minutes at room temperature by use of a V-type mixer (Micro-Type S-3 See-Through-Type Mixer: product of Tsutsui Rika Kagaku Kikai Co., Ltd.). The thus-obtained mixture was melt extruded and pelletized by use of a small-sized kneading extruder (Minimax Mixtruder: product of Toyo Seiki Co., Ltd.) at a melt kneading temperature of 200° C.

For the Comparative Examples, compositions containing the following substances were pelletized.

(A) propylene-containing polymer (0) crystalline propylene polymer: MFR =8.0 g/10 min; Mw=250,000

(I) crystalline propylene-ethylene block copolymer: MFR=2.5 g/10 min; ethylene content=7 wt %

(C) non-crystalline propylene-ethylene random copolymer (EP02P: product of Japan Synthetic Rubber Co., Ltd.): ethylene-propylene rubber having a Mooney viscosity of 24

The above-described components were mixed in mixing proportions described in Table III-1, and the resultant mixture was pelletized in a manner similar to that described in the Examples.

The pellets obtained in each of the Examples and the Comparative Examples were injection molded into small test pieces by use of a small-sized injection molding machine (Minimax Molder: product of Toyo Seiki Co., Ltd.) at a melt temperature of 200° C. and a mold temperature of 18° C. The test pieces were preconditioned in a thermostatic chamber at a humidity of 50% and a chamber temperature of 23° C. for 72 hours. The thus-obtained test pieces were evaluated in terms of tensile strength, flexural modulus, Izod impact strength, and appearance. The results are summarized and shown in Table III-1.

TABLE III-1

|  | Ex. III-1 | Ex. III-2 | Ex. III-3 | Ex. III-4 | Ex. III-5 | Ex. III-6 | Comp. Ex. III-1 | Comp. Ex. III-2 | Comp. Ex. III-3 | Comp. Ex. III-4 |
|---|---|---|---|---|---|---|---|---|---|---|
| (A) | — | — | — | — | — | — | | | | |
| (0) Parts by weight | | | | | | | 50 | 25 | — | — |
| Mw ($\times 10^4$) | | | | | | | 25 | 25 | | |
| Tm (° C.) | | | | | | | 161 | 161 | | |
| MFR | | | | | | | 8.0 | 8.0 | | |
| (I) Parts by weight | | | | | | | — | — | 50 | 25 |
| Mw ($\times 10^4$) | | | | | | | | | 30 | 30 |
| EL (%) | | | | | | | | | 7 | 7 |
| Tm (° C.) | | | | | | | | | 161 | 161 |
| MFR | | | | | | | | | 2.5 | 2.5 |
| (B) Type | (a) | (b) | (c) | (d) | (e) | (f) | | | | |
| Parts by weight | 100 | 100 | 100 | 100 | 100 | 100 | — | — | — | — |
| Mw ($\times 10^4$) | 34 | 12 | 9.5 | 28 | 24.3 | 34 | | | | |
| Mw/Mn | 6.6 | 4.0 | 12.0 | 6.5 | 4.7 | 8.4 | | | | |
| CO (%) | 72.9 | 64.1 | 65.6 | 55.3 | 72.7 | 80.5 | | | | |
| EL (%) | 29.4 | 33.5 | 33.8 | 20.6 | 28.0 | 26.7 | | | | |
| XLsolb (%) | 12.4 | 23.1 | 26.6 | 15 | 16 | 21 | | | | |
| Tm (° C.) | 158.4 | 157.5 | 158.2 | 158.0 | 159.0 | 159.5 | | | | |
| MFR | 2.0 | 25 | 200 | 3.5 | 4.2 | 2.0 | | | | |
| (C) Type | | | | | | | EP02P | EP02P | EP02P | EP02P |
| Parts by weight | — | — | — | — | — | — | 50 | 75 | 50 | 75 |
| M | | | | | | | 24 | 24 | 24 | 24 |

TABLE III-1-continued

|  | Ex. III-1 | Ex. III-2 | Ex. III-3 | Ex. III-4 | Ex. III-5 | Ex. III-6 | Comp. Ex. III-1 | Comp. Ex. III-2 | Comp. Ex. III-3 | Comp. Ex. III-4 |
|---|---|---|---|---|---|---|---|---|---|---|
| Entire composition |  |  |  |  |  |  |  |  |  |  |
| XLsolb (%) | 12.4 | 23.1 | 26.6 | 15 | 16 | 21 | 48 | 72 | 54 | 77 |
| MFR | 2.0 | 25 | 200 | 3.5 | 4.2 | 2.0 | 4.5 | 3.0 | 5.0 | 3.5 |
| Physical properties of product |  |  |  |  |  |  |  |  |  |  |
| Flexural modulus | 260 | 260 | 206 | 468 | 245 | 146 | 400 | 168 | 320 | 133 |
| Tensile strength | 12.1 | 10.4 | 8.1 | 17.4 | 11.9 | 9.5 | 11.7 | 5.2 | 8.5 | 6.1 |
| Elongation at break | 420 | 350 | 320 | 540 | 435 | 340 | 390 | 210 | 400 | 250 |
| Iz impact strength | NB | NB | 14.0 | NB | NB | NB | 53 | NB | NB | NB |
| Blushing by tensile | ○ | ○ | ○ | ○ | ○ | ○ | X | Δ | X | Δ |

CO: poly(ethylene-co-propylene) segment content (wt. %) in polypropylene-b-poly(ethylene-co-propylene);
EL: Ethylene content (wt. %) in polypropylene-b-poly(ethylene-co-propylene);
Mw: Weight-average molecular weight;
Mw/Mn: Molecular weight distribution index;
XLsolb: Content (wt. %) of component soluble in xylene at 20° C.;
M: Mooney viscosity;
Tm: Crystal melting peak temperature (° C.);
MFR: Amount (g/10 min) of discharged molten resin at 230° C. with 2.16-kg load;
Flexural modulus (MPa);
Tensile strength (MPa);
Elongation at break (%)
Iz impact strength: Izod impact strength (kJ/m$^2$);
NB: Not broken Industrial Applicability of the Present Invention III The present invention III was able to provide a polypropylene-containing moldable elastomer. The moldable elastomer provides, when it is used as the sole component, a molded article that is endowed with excellent transparency, blushing resistance, flexibility, impact resistance, and mechanical strength.

The moldable elastomer according to the present invention III may be used for various molding processes such as injection molding, compression molding, vacuum molding, blow molding, extrusion molding, film forming, sheet forming, and calendering, to thereby yield molded articles for various applications such as interior and exterior materials for automobiles, domestic electric appliances, daily necessaries, medical grade material, and fibers.

Moreover, the thus-obtained molded article is less susceptible to flow marking on its surfaces, sink marking, and burring.

What is claimed is:

1. A polypropylene-b-poly(ethylene-co-propylene), having a weight-average molecular weight (Mw) of 100,000 or more; a poly(ethylene-co-propylene) segment content of not less than 5 wt. % and less than 100 wt. %; and a total ethylene content of 2–95 wt. %, wherein the polypropylene-b-poly(ethylene-co-propylene) has the following characteristics (a) and (b):

(a) polypropylene segments and poly(ethylene-co-propylene) segments are linked chemically; and (b) the polypropylene segments and poly(ethylene-co-propylene) segments are synthesized in the presence of an olefin polymerization catalyst comprising an organometallic compound and a solid catalyst component comprising either titanium and a halogen or titanium, magnesium, and a halogen.

2. The propylene-ethylene block copolymer as described in claim 1, wherein the propylene-ethylene block copolymer has a molecular weight distribution index (weight-average molecular weight (Mw)/number-average molecular weight (Mn)) of 3.5 or more.

3. The propylene-ethylene block copolymer as described in claim 1, wherein the propylene-ethylene block copolymer contains a xylene-soluble component during extraction by use of xylene at 20° C. in an amount of 50 wt % or less.

4. The propylene-ethylene block copolymer as described in claim 1, wherein the ratio of the poly(ethylene-co-propylene) segments remaining after extraction by use of xylene at 20° C. to the segments before extraction is 50 wt. % or more.

5. The propylene-ethylene block copolymer as described in claim 1, wherein the ratio of the total ethylene content remaining after extraction by use of xylene at 20° C. to the content before extraction is 50 wt. % or more.

6. The propylene-ethylene block copolymer as described in claim 1, wherein the propylene-ethylene block copolymer has an elution-completion temperature in cross-fractionation chromatography of 100–120° C.

7. The propylene-ethylene block copolymer as described in claim 1, wherein the propylene-ethylene block copolymer has a melting point (Tm) of 135° C. or higher.

8. The propylene-ethylene block copolymer as described in claim 1, wherein the propylene-ethylene block copolymer exhibits a melt tension at 190° C. of 1.0 g or more.

9. The propylene-ethylene block copolymer as described in claim 1, wherein the peak temperature of complex modulus loss tangent (tanδ) based on glass transition temperature of the PP portion of the propylene-ethylene block copolymer falls within the range of −50° C. to 10° C.

10. The propylene-ethylene block copolymer as described in claim 1, wherein the propylene-ethylene block copolymer exhibits a storage modulus (E') at 150° C. of $(0.1–30)\times 10^7$ dyne/cm$^2$.

11. A molded article formed by molding a propylene-ethylene block copolymer containing polypropylene-b-poly(ethylene-co-propylene), characterized by having a weight-average molecular weight (Mw) of the propylene-ethylene block copolymer of 100,000 or more; a poly(ethylene-co-propylene) segment content of not less than 5 wt. % and less than 100 wt. %; and a total ethylene content of 2–95 wt. %, wherein the propylene-ethylene block copolymer has the following characteristics (a) and (b):

(a) polypropylene segments and poly(ethylene-co-propylene) segments are linked chemically; and (b) the polypropylene segments and poly(ethylene-co-propylene) segments are synthesized in the presence of an olefin polymerization catalyst comprising an organometallic compound and a solid catalyst component comprising either titanium and a halogen or titanium, magnesium, and a halogen, and the molded article has a flexural modulus of 100–1,200 MPa.

12. The molded article as described in claim 11, wherein the propylene-ethylene block copolymer has a molecular weight distribution index (weight-average molecular weight (Mw)/number-average molecular weight (Mn)) of 3.5 or more.

13. The molded article as described in claim 11, wherein the propylene-ethylene block copolymer contains a xylene-soluble component during extraction by use of xylene at 20° C. in an amount of 50 wt. % or less.

14. The molded article as described in claim 11, wherein the ratio of the poly(ethylene-co-propylene) segments remaining after extraction by use of xylene at 20° C. to the segments before extraction is 50 wt. % or more.

15. The molded article as described in claim 1, wherein the ratio of the total ethylene content remaining after extraction by use of xylene at 20° C. to the content before extraction is 50 wt. % or more.

16. The molded article as described in claim 1, wherein the propylene-ethylene block copolymer has an elution-completion temperature in cross-fractionation chromatography of 100–120° C.

17. The molded article as described in claim 1, wherein the propylene-ethylene block copolymer has a melting point (Tm) of 135° C. or higher.

18. The molded article as described in claim 1, wherein the propylene-ethylene block copolymer exhibits a melt tension at 190° C. of 1.0 g or more.

19. The molded article as described in claim 1, wherein the peak temperature of complex modulus loss tangent (tan$\delta$) based on glass transition temperature of the PP portion of the propylene-ethylene block copolymer falls within the range of −50° C. to 10° C.

20. The molded article as described in claim 1, wherein the propylene-ethylene block copolymer exhibits a storage modulus (E') at 150° C. of $(0.1-30) \times 10^7$ dyne/cm$^2$.

21. A molded article formed by molding a propylene-ethylene block copolymer containing polypropylene-b-poly(ethylene-co-propylene), characterized in that the weight-average molecular weight (Mw) of the propylene-ethylene block copolymer is 100,000 or more; the poly(ethylene-co-propylene) segment content is not less than 5 wt. % and less than 100 wt. %; the total ethylene content is 2–95 wt. %; the molecular weight distribution index (weight-average molecular weight (Mw)/number-average molecular weight (Mn)) is 3.5 or more; the propylene-ethylene block copolymer contains a xylene-soluble component during extraction by use of xylene at 20° C. in an amount of 50 wt. % or less; and the ratio of the poly(ethylene-co-propylene) segments remaining after extraction by use of xylene at 20° C. to the segments before extraction is 50 wt. % or more, and the molded article has a flexural modulus of 100–1,200 MPa.

22. The molded article as described in claim 21, wherein the ratio of the total ethylene content remaining after extraction by use of xylene at 20° C. to the content before extraction is 50 wt. % or more.

23. The molded article as described in claim 21, wherein the propylene-ethylene block copolymer has an elution-completion temperature in cross-fractionation chromatography of 100–120° C.

24. The molded article as described in claim 21, wherein the propylene-ethylene block copolymer has a melting point (Tm) of 135° C. or higher.

25. The molded article as described in claim 21, wherein the propylene-ethylene block copolymer exhibits a melt tension at 190° C. of 1.0 g or more.

26. The molded article as described in claim 21, wherein the peak temperature of complex modulus loss tangent (tan$\delta$) based on a glass transition temperature of the PP portion of the propylene-ethylene block copolymer falls within the range of −50° C. to 10° C.

27. The molded article as described in claim 21, wherein the propylene-ethylene block copolymer exhibits a storage modulus (E') at 150° C. of $(0.1-30) \times 10^7$ dyne/cm$^2$.

28. A molded article formed by molding a blushing-resistant transparent polypropylene resin for molding containing polypropylene-b-poly(ethylene-co-propylene), characterized by having a poly(ethylene-co-propylene) segment content of polypropylene-b-poly(ethylene-co-propylene) of not less than 5 wt. % and less than 50 wt. %, and a total ethylene content of polypropylene-b-poly(ethylene-co-propylene) of 0.25–47 wt. %, wherein the polypropylene-b-poly(ethylene-co-propylene) has the following characteristics (a) and (b):

(a) polypropylene segments and poly(ethylene-co-propylene) segments are linked chemically; and (b) the polypropylene segments are synthesized in the presence of an olefin polymerization catalyst comprising an organometallic compound and a solid catalyst component comprising either titanium and a halogen or titanium, magnesium, and a halogen, and subsequently, the poly(ethylene-co-propylene) segments are synthesized, and the molded article has a flexural modulus of 100–1,200 MPa and exhibits no blushing due to 300% elongation.

29. The molded article as described in claim 28, wherein the polypropylene-b-poly(ethylene-co-propylene) has a weight-average molecular weight (Mw) of 30,000 or more.

30. The molded article as described in claim 28, wherein the polypropylene-b-poly(ethylene-co-propylene) has a molecular weight distribution index (weight-average molecular weight (Mw)/number-average molecular weight (Mn)) of 3.5 or more.

31. The molded article as described in claim 28, wherein the polypropylene-b-poly(ethylene-co-propylene) contains a component soluble in xylene at 20° C. in an amount of 50 wt. % or less.

32. The molded article as described in claim 28, wherein the polypropylene-b-poly(ethylene-co-propylene) has a melting point (Tm) of 135° C. or higher.

33. The molded article as described in claim 32, wherein molding is carried out through injection molding.

34. The propylene-ethylene block copolymer as described in claim 2, wherein the propylene-ethylene block copolymer contains a xylene-soluble component during extraction by use of xylene at 20° C. in an amount of 50 wt. % or less.

* * * * *